Nov. 16, 1965   L. A. DEVER   3,217,406
AUTOMATIC TOOL CHANGING APPARATUS
Filed Feb. 28, 1963   16 Sheets-Sheet 1

INVENTOR
LEWIS A DEVER
BY
ATTORNEYS

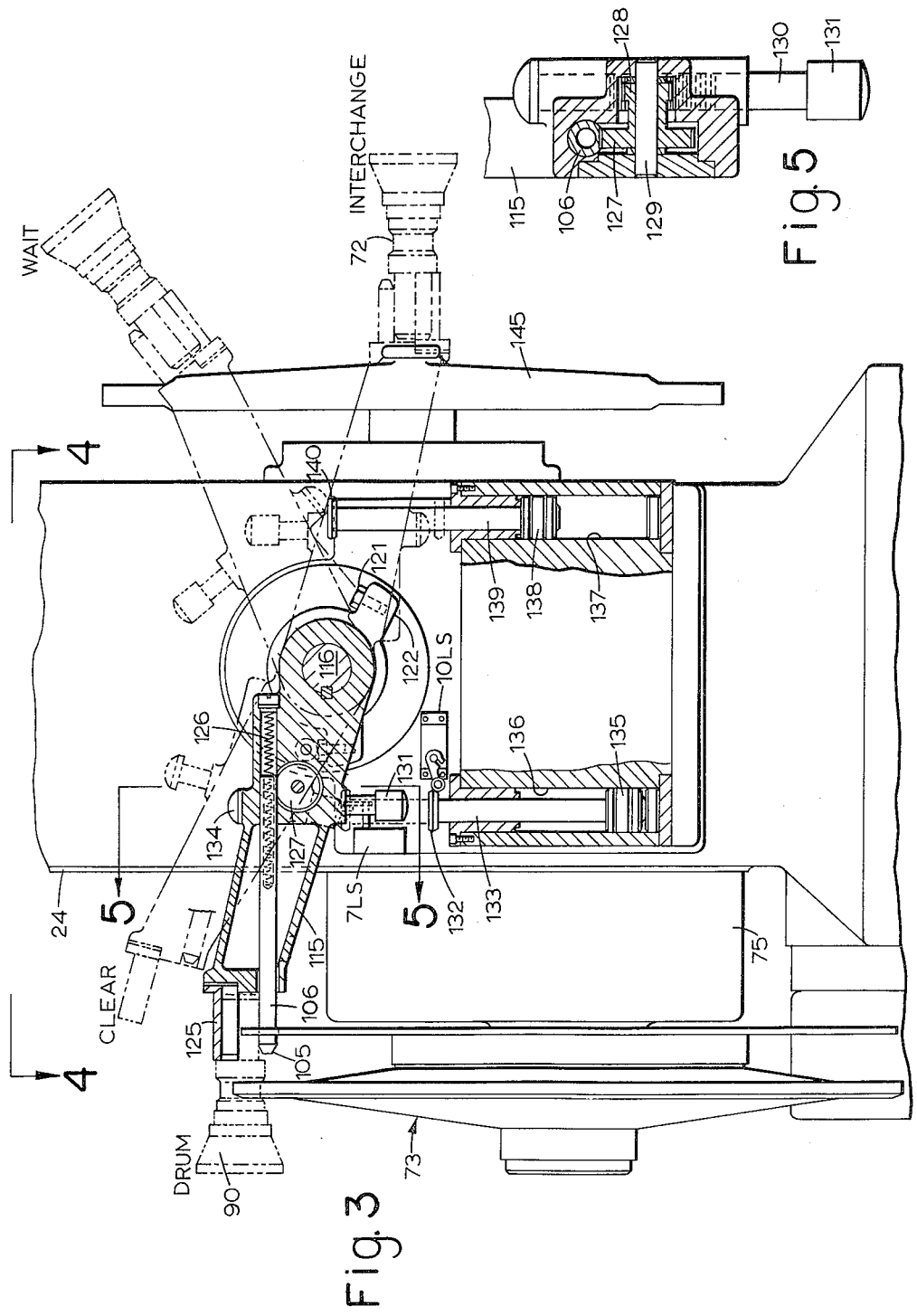

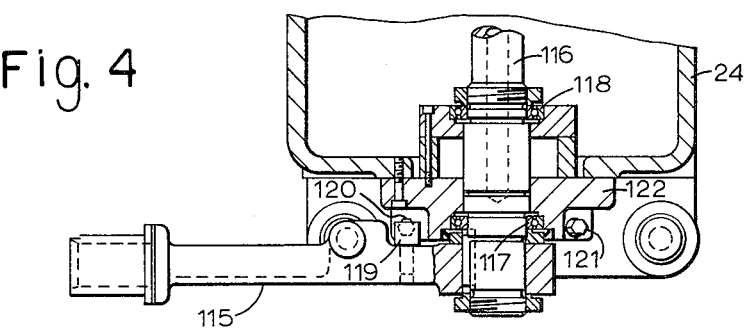
Fig. 4
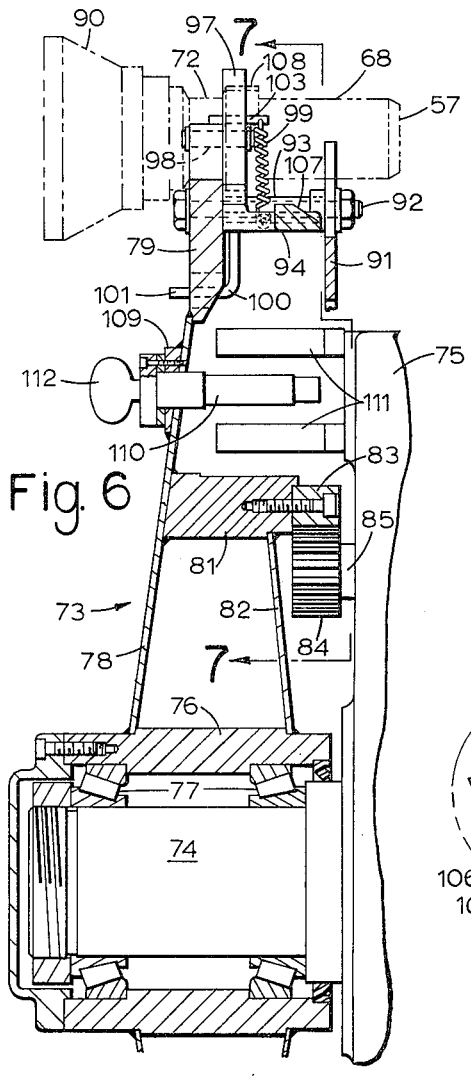
Fig. 6
Fig. 7a
Fig. 7b
Fig. 7c

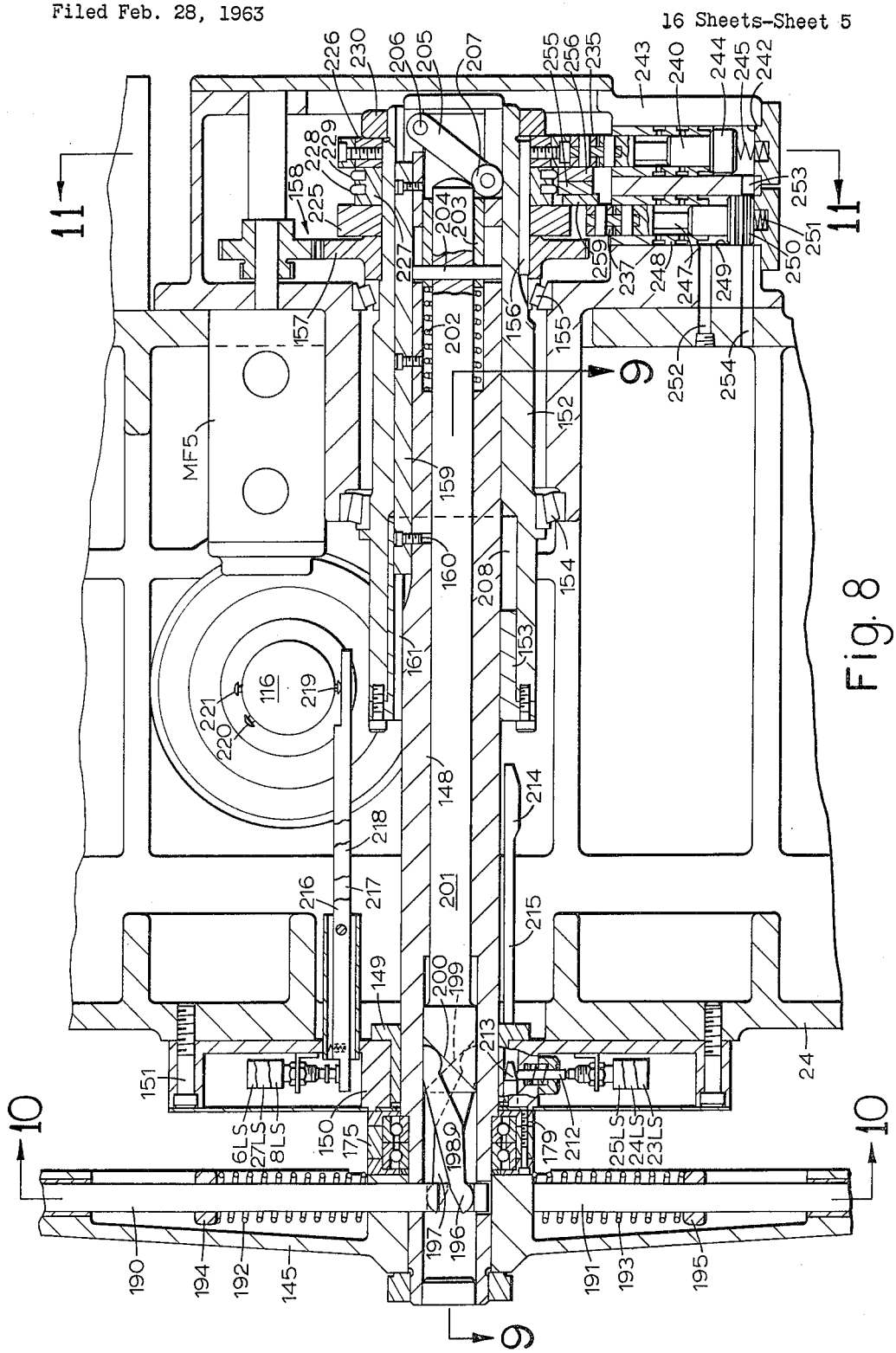

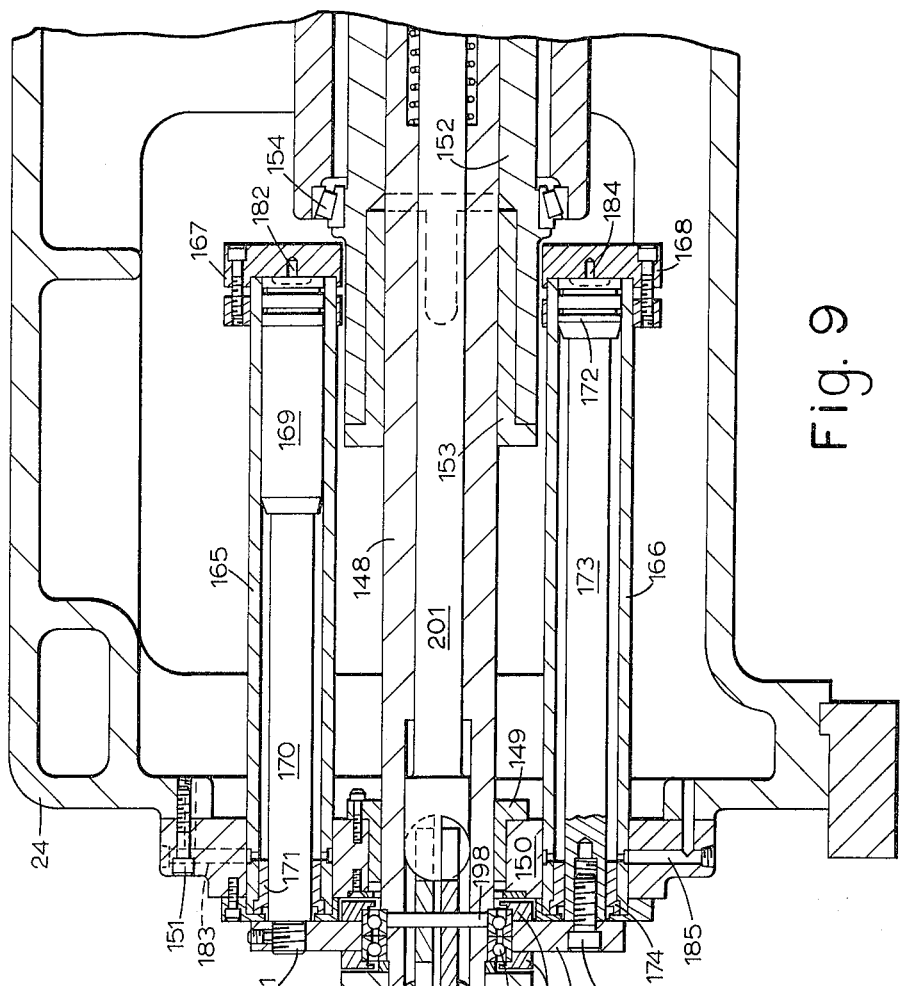
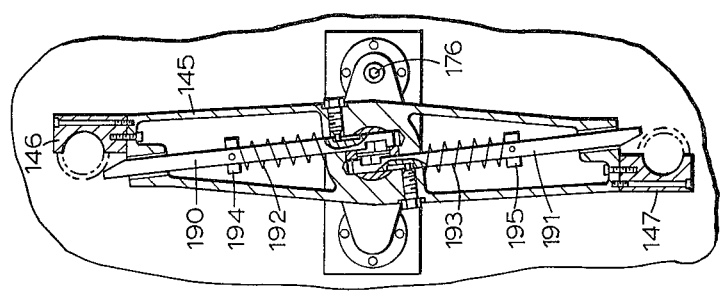

Nov. 16, 1965 L. A. DEVER 3,217,406
AUTOMATIC TOOL CHANGING APPARATUS
Filed Feb. 28, 1963 16 Sheets-Sheet 7

Nov. 16, 1965  L. A. DEVER  3,217,406
AUTOMATIC TOOL CHANGING APPARATUS
Filed Feb. 28, 1963  16 Sheets-Sheet 9
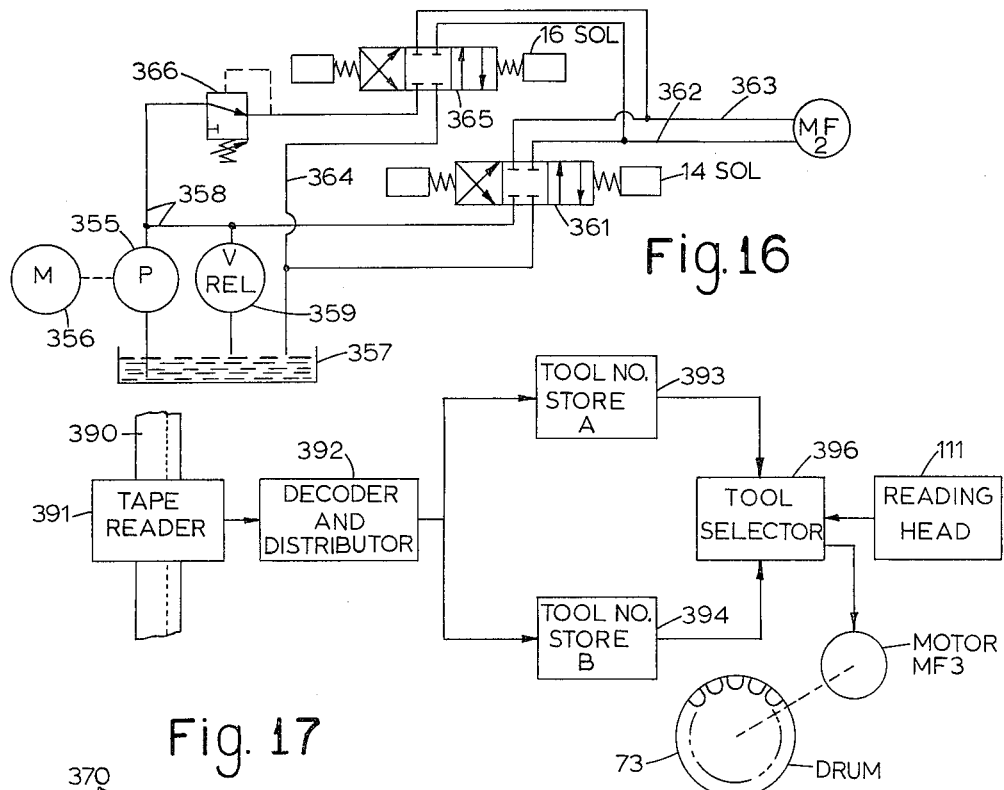
Fig. 16
Fig. 17
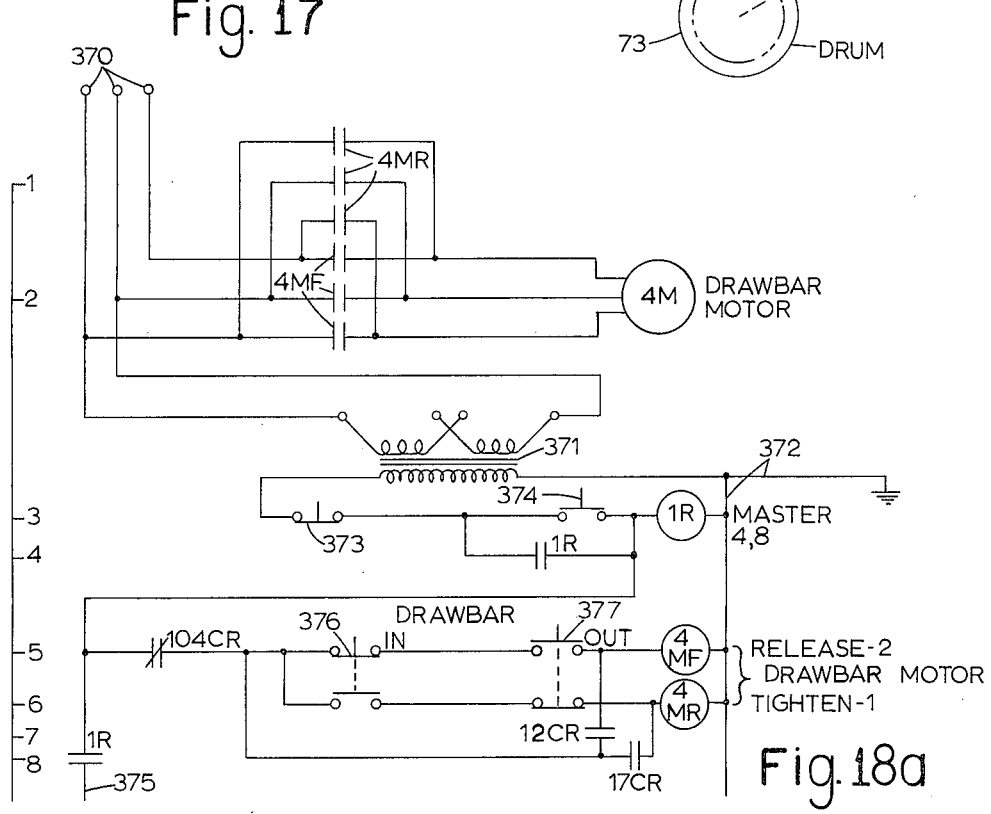
Fig. 18a 3,217,406
Patented Nov. 16, 1965

1

3,217,406
AUTOMATIC TOOL CHANGING APPARATUS
Lewis A. Dever, Cincinnati, Ohio, assignor to The Cincinnati Milling Machine Co., Cincinnati, Ohio, a corporation of Ohio
Filed Feb. 28, 1963, Ser. No. 261,670
21 Claims. (Cl. 29—568)

This invention relates to an automatic tool changing apparatus and, more particularly, to an apparatus for transferring a selected tool from its receptacle in a storage unit to the spindle of a machine tool and then back to its receptacle at the conclusion of the machining operation.

The present device differs from known tool changers in that it enables the new tool to be selected and moved to a pickup position during a machining operation and also for permitting the old tool to be returned to the same receptacle in the storage means from which it was originally withdrawn. Thus, the new tool changing device has the advantage of saving the time required for the selection and positioning of a new tool while at the same time permitting the most economical use to be made of the tool storage unit. For example, when large diameter milling cutters are required for a machining program, it is necessary to allow extra space on each side of the cutter in the storage unit. This usually means that at least one storage receptacle on each side of the one receiving the tool must remain empty. If the tool change mechanism is of the type in which the old tool is returned to the same receptacle from which the new tool was removed, the necessary space therefor must be provided adjacent each receptacle which is adapted to receive a cutter. In other words, if the storage unit is of the type in which the tools are arranged in a single file, and the large diameter cutter requires that the receptacle on either side of it be left empty, then the storage capacity of the unit will be cut in half. With applicant's arrangement however, in which the tools are always returned to the same receptacles from which they were originally withdrawn, the storage capacity will be reduced only by two tools, i.e., the receptacles on each side of the large tool which must remain empty.

The new design of automatic tool changer which forms the subject matter of the present application also has the advantage that the tool storage unit may be located at the rear of the machine where it is out of the way of the chips and coolant thrown off by the cutting tool.

Accordingly, it is an object of the present invention to provide a new and improved type of automatic tool changing apparatus.

Another object of the invention is to provide an automatic tool change mechanism in which the new tool is selected and removed from its receptacle in the tool storage unit during a machining operation and in which the receptacle for the old tool is moved into position to receive the same after the new tool has been removed but before the actual tool changing operation takes place.

Another object of the invention is to provide an automatic tool change mechanism in which a single arm transfers the cutting tools between the tool storage unit and a tool interchange position, and in which a double arm interchanges the old tool in the spindle with the new tool held in the single arm.

Another object of the invention is to provide an automatic tool change mechanism in which the new tool is moved to a pickup position where it is removed from its receptacle in the storage unit by a single arm and carried to an interchange position while the receptacle for the old tool is returned to the pickup position, and in which the new tool held in the single arm is interchanged with the old tool in the spindle by a double arm after which the old tool is returned by the single arm to its receptacle in the storage unit.

Another object of the invention is to provide an automatic tool change mechanism of the type set forth in the preceding object in which a member coded with tool identifying data is associated with each of the receptacles in the storage unit.

With these and other objects in view which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

In the drawings:

FIG. 3 is a side view of a portion of the machine shown in FIG. 2.

FIG. 4 is a cross-sectional view taken along the line 4—4 in FIG. 3.

FIG. 5 is a cross-sectional view taken along the line 5—5 in FIG. 3.

FIG. 6 is a cross-sectional view taken along the line 6—6 in FIG. 2.

FIG. 7a is an elevation of a portion of the tool storage drum shown in FIG. 6.

FIGS. 7b and 7c are detailed views of the mechanism shown in FIG. 7a.

FIG. 8 is a cross-sectional view taken along the line 8—8 in FIG. 2.

FIG. 9 is a cross-sectional view taken along the line 9—9 in FIG. 8.

FIG. 10 is a cross-sectional view taken along the line 10—10 in FIG. 8.

FIG. 16 is a diagrammatic view showing the hydraulic circuit for the spindle drive motor.

FIG. 17 is a block diagram of the tool selection apparatus of the present machine.

FIGS. 18a-g, 19 and 20 together constitute a wiring diagram of the automatic tool change mechanism shown in the preceding figures.

Figure 1:
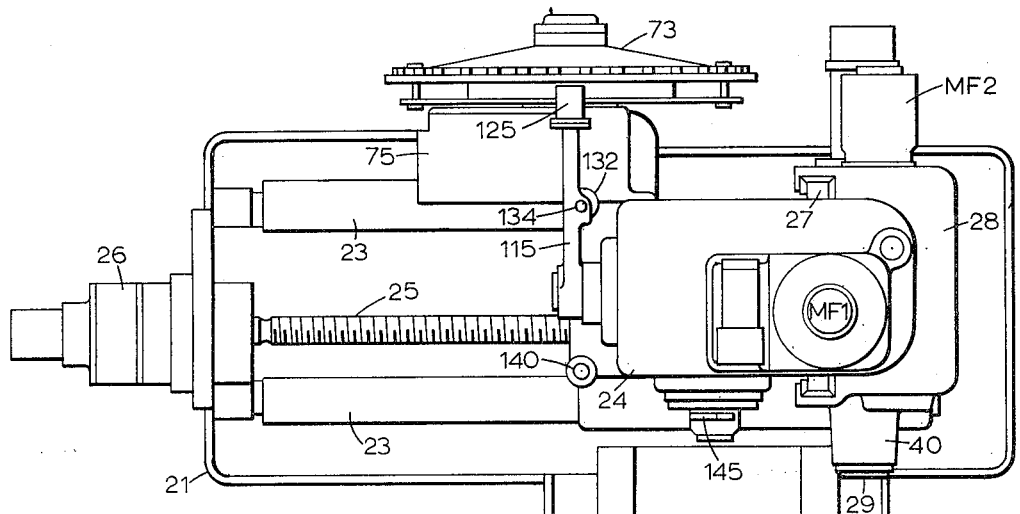
FIG. 1 is a plan view of a horizontal milling machine equipped with an automatic tool change mechanism embodying the principles of the present invention.
Figure 2:
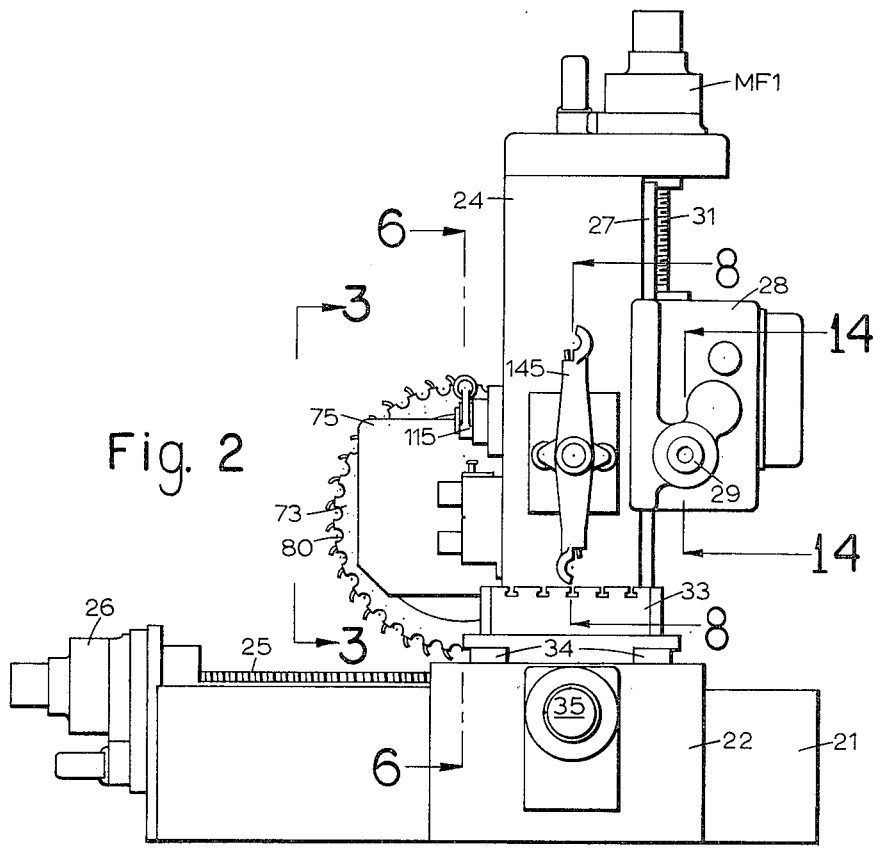
FIG. 2 is a front view of the machine shown in FIG. 1.

The automatic tool change mechanism of the present invention is shown herein as applied to a three axis, horizontal milling machine of the traveling column type. As seen in FIGS. 1 and 2, the machine includes a bed 21 which is provided with a forwardly extending wing base 22. A pair of horizontally extending ways 23 are provided on the bed 21 to provide for sliding movement of a column 24 along the bed. Movement of the column along the ways 23 is effected by a lead screw 25 driven by a hydraulic motor 26 supported on one end of the bed.

The column 24 is provided with a pair of vertically extending ways 27 on which a spindle carrier 28 is supported for vertical sliding movement along the column. The spindle carrier is fitted with a spindle 29 which is adapted to be driven by a hydraulic motor MF2 (FIG. 1). Vertical movement of the spindle carrier 28 along the ways 27 is effected by a lead screw 31 (FIG. 2) driven by a hydraulic motor MF1 mounted on top of the column.

A third axis of motion is provided by a work-supporting table 33 which is slidable along a pair of horizontal ways 34 supported on the wing base 22 and extending at right angles to the ways 23 on the main bed. Movement of the table toward and from the spindle is effected by a hydraulic motor 35 mounted on the wing base which drives a lead screw (not shown) meshing with a nut carried by the table.

Figure 14:
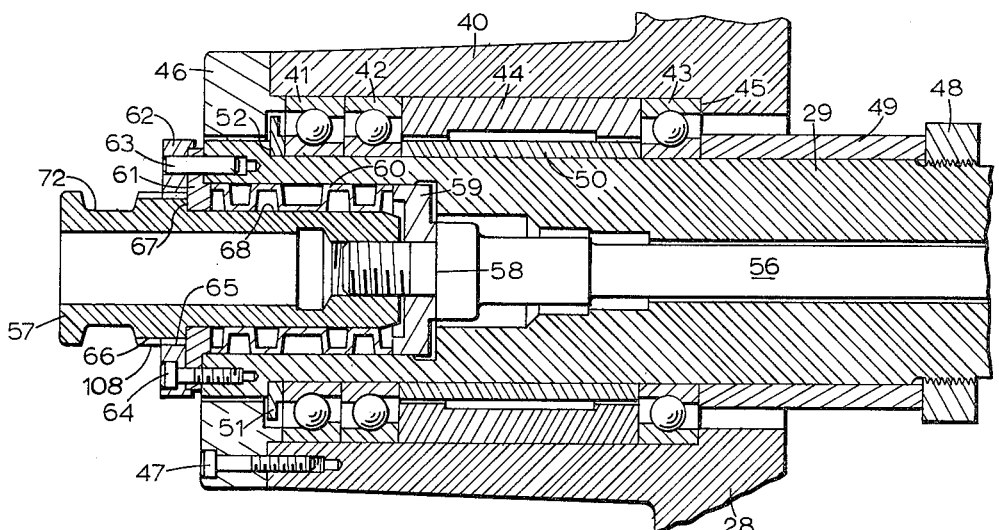
FIG. 14 is a cross-sectional view taken along the line 14—14 in FIG. 2.

A detail view of the spindle nose is shown in FIG. 14 of the drawings. As therein shown, the spindle carrier 28 is provided with a forwardly projecting boss 40 which is bored to receive ball bearings 41, 42 and 43 and a spacer 44. The bearings and the spacer are held in place inside the boss by a shoulder 45 and a retaining ring 46 which is secured to the boss by screws 47. The forward end of the spindle 29 is supported by the ball bearings for rotation within the boss 40, the inner races of the bearings being seated upon the spindle and being held in place thereon by a nut 48, spacers 49 and 50, slinger ring 51, and a shoulder 52 formed on the forward end of the spindle.

The spindle is provided with an axially extending bore for receiving a draw bar 56 which may be operated by a power drive mechanism of the type shown in U.S. Patent No. 2,667,819, granted February 2, 1954, to Charles B. De Vlieg, to lock a tool holder in the spindle nose. The draw bar is threaded at its forward end for engagement with corresponding threads provided in the rear end of a tool holder 57 which is adapted to be inserted in and withdrawn from the spindle nose by the automatic tool change mechanism. The forward end of the draw bar is also formed with a shoulder 58 which provides an abutment surface for a washer 59 which is slidably received on the threaded portion of the draw bar. The tool holder 57 is adapted to be gripped in the spindle nose by a squeeze bushing 60 which bears at its rear end against the washer 59 and at its forward end against the rear face of a locating ring 61. This ring is held in place on the spindle nose by a driver plate 62 which is held by a locating pin 63 and screws 64 in position on the spindle nose with the locating ring 61 lying between it and the forward end of the spindle. The driver plate 62 is provided on its inner periphery with serrations or teeth 65 which are adapted to receive and mesh with corresponding serrations or teeth 66 provided on the tool holder 57.

When the tool holder is inserted in the spindle nose by the automatic tool change mechanism, the draw bar 56 is pushed rearwardly in the spindle against the bias of a spring (not shown). When the draw bar is rotated by the drive motor as disclosed in the aforementioned De Vlieg patent, the threaded end of the bar enters the threaded hole formed in the rear end of the tool holder and draws it into the spindle nose until a shoulder 67 thereon contacts the forward face of the locating ring 61. Thereafter, the squeeze bushing 60 will be compressed between the washer 59 and the rear face of the locating ring 61 and will provide a gripping engagement between the tool holder and the spindle. It will be realized of course that the positive driving connection between the tool holder and the spindle provided by the teeth 65 and 66 will provide the positive drive required to rotate tools requiring considerable amounts of torque such as large milling cutters.

To facilitate the automatic handling of the tools by the tool change mechanism, each tool is mounted in a holder like the holder 57 shown in FIG. 14. Thus, the shank portion of each tool and tool holder assembly is of identical length and diameter and each unit is provided with a groove 72 formed in the forward end of each of the tool holders.

The tools with their assembled tool holders are held in a storage unit provided with individual compartments for containing the individual tools. In the present embodiment of the invention, this storage unit takes the form of a drum 73 which, as shown in FIG. 6, is journalled for rotation on a stub shaft 74 mounted on a drive box 75 attached to the rear side of the column 24.

As seen in FIG. 6, the drum 73 is of fabricated construction and includes a hub 76 which is supported by roller bearings 77 on the stub shaft 74, a frusto-conical disc 78 welded to the hub, and a rim 79 welded to the peripheral edge of the disc. The rim 79 is provided on its periphery with a plurality of spaced semi-circular recesses 80 (FIG. 7a) which are adapted to receive the groove 72 (FIG. 14) provided in each of the tool holders 57. Welded to the inside of the disc 78 is a ring 81 which is also supported by a frusto-conical disc 82 welded to the hub 76 and also to the ring 81. Bolted to the ring 81 is a ring gear 83 which meshes with a drive gear 84 secured to a drive shaft 85. The means for driving the shaft 85 will be described in a later portion of the specification.

In FIG. 6, there is shown in dotted outline a milling cutter 90 assembled into a tool holder 57 which has its groove 72 engaged in one of the recesses 80 in the rim 79. For the purpose of supporting the shank 68 of the tool holder, an annular plate 91 is secured in spaced relation to the rim 79 by bolts 92 and spacers 93. The plate 91 is provided with semi-circular recesses similar to the recesses 80 and in axial alignment therewith for receiving and supporting the shanks 68 of the tool holders 57. The bolts 92 are evenly spaced about the drum there being one bolt for each tool holding recess. Each spacer 93 has journalled thereon a bail-shaped latch 94 formed with a shoulder 95 (FIG. 7c) which cooperates with an abutment face 96 on the lower end of a pivoted keeper 97. The keeper 97 is journalled on a pivot pin 98 which is supported in the rim 79. The latch 94 and keeper 97 are connected by a tension spring 99 which urges the latch 94 clockwise as viewed in FIG. 7a and acts as an over-center spring for the keeper 97. The latch may be rotated either manually or automatically against the urgency of the spring to unlatch the keeper. For manual release of the keeper, the latch 94 has extending from the bottom thereof a handle 100 which has a bent portion 101 (FIG. 6) extending through an aperture 102 in the rim 79. As shown in FIG. 7c the portion 101 cooperates with the left hand edge of the aperture 102 to limit clockwise movement of the latch under the influence of spring 99. Also, as shown in FIG. 6, the spring pin 103 in keeper 97 extends beyond the opposite side of the keeper where it lies over the peripheral face 104 (FIG. 7c) of the rim 79 to thereby limit clockwise rotation of the keeper about the pin 98.

Automatic release of the latch 94 is effected by the beveled end 105 (FIG. 3) of a rod 106 which, when projected toward the drum, is adapted to engage with a cam surface 107 formed on the latch 94 and cams the latch counterclockwise, as shown in FIG. 7b, so as to release the keeper 97.

Once the latch is released, the tool assembly may readily be removed from its storage receptacle. As the tool moves out of the recesses, the cylindrical surface 108 (FIGS. 6 and 7a) on the tool holder will rotate the keeper clockwise and move the abutment face 96 above the shoulder 95 (FIG. 7c). As the tool continues its outward movement, the over-center action of the spring 99 will cause the lever to be moved to its extreme clockwise position as shown in FIG. 7c. The lever will remain in this position until the tool is returned to its receptacle whereupon the cylindrical surface 108 will contact the lower end of the keeper 97 and rock it counterclockwise against the urgency of the spring 99 until the tool is fully seated in the recesses when the shoulder 95 will again engage the abutment surface 96 on the keeper when the latch is released.

The drum is also provided with sockets 109 for receiving key cartridges 110 which pass through a reading head 111 secured to the drive box 75 when the drum is rotated. The number of cartridges 110 is equal to the number of tool receptacles on the drum, and each cartridge lies directly beneath its associated receptacle. The cartridges are adapted to receive keys 112 which are coded with numbers corresponding to the numbers of their associated tools. The reading head is so positioned on the drive box that it will read the tool number encoded on a particular key 112 when the receptacle associated with that key is in the pickup position.

Referring now to FIGS. 3 and 4 of the drawings, the tools carried by the drum are adapted to be removed therefrom and transferred to a forward position by a single arm 115 secured to a shaft 116. This shaft is journalled in the column 24 by means of anti-friction bearings 117 and 118 in the manner shown in FIG. 4. Movement of the arm 115 and shaft 116 is limited to approximately 180° or, in other words, from a Drum position (FIG. 3) to an Interchange position. These limits of movement are determined by a stud 119 attached to the arm which cooperates with adjusting screws 120 and 121 supported by a bearing bracket 122 which is bolted to the side of the column 24.

The arm 115 is provided at its outer end with a socket 125 which is generally semi-cylindrical in shape and is adapted to receive the shank 68 of each tool holder. The tool holder is adapted to be held within the socket by the rod 106 which is mounted in the arm for axial sliding movement and is urged toward its tool locking position by means of a compression spring 126 received in a bore provided in the rod. The rear end of rod 106 is provided with a series of rack teeth which are engaged by a spur gear 127 (see also FIG. 5) formed integrally with a second spur gear 128. The gears are journalled on a shaft 129 supported in the arm 115 and the gear 128 meshes with rack teeth formed on a plunger 130 carried by the arm. Due to the action of spring 126, the plunger 130 is normally held extended, as shown in FIGS. 3 and 5, with a head 131 thereon lying immediately above a disc 132 secured to the upper end of a piston rod 133. A head 134 formed on the opposite end of the plunger 130 provides a limit stop for outward movement of the rod 106 under the influence of spring 126. The piston rod 133 is fitted with a piston 135 working in a cylinder 136 mounted within the column 24.

There is also provided in the column 24 a cylinder 137 containing a piston 138 mounted on a piston rod 139. The piston rod 139 has secured to its upper end a disc 140 which is adapted to cooperate with the head 134 on the plunger 130 when the piston 138 is in the upper end of the cylinder and when the arm 115 is moved to a forward position as shown in FIG. 3.

Clockwise rotation of the arm by means of a drive motor, hereinafter to be described, will cause the tool 90 to be removed from its receptacle in the drum and transferred to the Wait position (FIG. 3) where movement of the arm will be stopped by the disc 140 engaging with the head 134. If, at the end of a machining operation, a tool change is called for, the pressure in the cylinder 137 may be released to permit the arm to move down to the Interchange position. After the old tool in the spindle has been interchanged with the new tool in the arm 115, the arm may be rotated counterclockwise to return the old tool to its receptacle in the drum. Thereafter, in order to permit the drum to rotate for the purpose of selecting a new tool, fluid pressure is introduced to the lower end of the cylinder 136. Thereby, the piston rod 133 will be raised and cause the disc 132 to engage and elevate the plunger 130 so as to first retract the rod 106 and then elevate the arm to the Clear position as shown in dot-dash outline in FIG. 3.

After a new tool has been moved from the storage drum and moved to the Wait position and thence to the Interchange position, a double arm 145 is brought into action to interchange the new tool in the arm with the old tool in the spindle of the machine tool. For this purpose, the double arm is provided with tool gripping sockets 146 and 147 (FIG. 10) on the distal ends thereof for engagement with the grooves 72 formed in the tool holders. The double arm is therefore able to withdraw the tools simultaneously from the arm and spindle and after 180° rotation, place the new tool in the spindle and the old tool in the arm 115.

As shown in FIGS. 8 and 9 the double arm is secured to the end of a hollow shaft 148 which is received for rotation and axial movement in the front of the column 24. At its forward end, the shaft 148 is journalled in a bushing 149 supported by a bracket 150 bolted to the front side of the column by bolts 151. At its rear end, the shaft is received in a drive sleeve 152 which is fitted at its left hand end with a bushing 153 which serves as a bearing for the shaft. The sleeve 152 is journalled in the frame work of the column by roller bearings 154 and 155. Secured to the sleeve 152 by a key 156 is a gear 157 which is connected through a gear train 158 with a hydraulic motor MF5. Rotation of the sleeve by the hydraulic motor is transmitted to the shaft 148 by a key 159 secured to the shaft by screws 160. The key 159 cooperates with a keyway 161 extending lengthwise of the sleeve 152.

Axial movements of the double arm 145 are effected by cylinders 165 and 166 (FIG. 9) supported at one end by the bracket 150 and at the other end by lugs 167 and 168 secured to the column 24. The cylinder 165 is fitted with a piston 169 secured to a piston rod 170 which is guided at its forward end by a bushing 171. In a similar manner, the cylinder 166 contains a piston 172 secured to a piston rod 173 which is guided at its forward end in a bushing 174 fitted in the end of the cylinder. The piston rod 173 is fastened by a screw 176 to a yoke 175 which is apertured to receive a pair of ball bearings 177 held in place therein by retaining rings 178 attached to the yoke by screws 179 (FIG. 8). The inner races of the ball bearings are arranged to seat on a shouldered portion of the shaft 168 where they are held by a nut 180 which also holds the double arm 145 on the shaft. Accordingly, movements of the piston 172 will cause the yoke 175 to be shifted in or out relative to the front of the column 24, the yoke carrying with it the shaft 148.

As viewed in FIG. 9, the left hand end of the piston rod 170 bears against an adjusting screw 181 so that movement of the piston 169 to the left is also effective to to extend the shaft 148 and arm 145 out from the column. The length of the piston 169, however, is such as to limit the amount of outward movement and thereby establish an intermediate or Mid position of the double arm. The cylinder 165 is provided with right and left hand ports 183 and 183 for connecting the cylinder to the hydraulic system, while the cylinder 166 is provided with right hand and left hand ports 184 and 185 for a similar purpose.

As shown in FIG. 10, the tools are adapted to be held in place in the sockets 146 and 147 by plungers 190 and 191 which are guided for longitudinal sliding movement within the double arm structure. The plungers are urged outwardly by compression springs 192 and 193 which surround the plungers and bear against collars 194 and 195 fastened thereto.

In FIGS. 8 and 10 the plungers are shown in their retracted positions where they are held by levers 196 and 197 pivoted on a pin 198 extending through the shaft 148. The lefthand ends of the levers are received in notches cut in the plungers 190 and 191 while the righthand ends thereof cooperate with inclined camming surfaces 199 and 200 formed on the lefthand end of a plunger 201 which is arranged for axial sliding movement within a bore formed in the shaft 148. At its righthand end, the plunger 201 is surrounded by a compression spring 202 which presses against a bushing 203 pinned to the plunger by a pin 204 the ends of which extend into elongated slots provided in the shaft 148. The plunger 201 is held in its lefthand position against the urgency of spring 202 by a lever 205 pivoted to the shaft 148 at 206 and provided at its opposite end with a roller 207 which bears against the inside diameter of the sleeve 152. The gripping plungers 190 and 191 will thereby be held in their retracted positions so long as the roller 207 lies to the left of a recess 208 formed near the lefthand end of the sleeve 152. When the shaft 148 and double arm 145 are moved to their fully extended positions, the roller 207 will enter the recess 208 and allow the plunger 201 to move to the right and release the levers 196 and 197. Thereby, the plungers 190 and 191 will be permitted to move outwardly under the influence of their springs 192 and 193 so as to engage the bottoms of the grooves 72 in the tool holders and clamp the tools securely to the arm 145.

The Fully Extended, Mid and Park positions of the double arm 145 are indicated by limit switches 23LS, 24LS, and 25LS (FIG. 8). These switches lie one behind the other as viewed in FIG. 8, the limit switch 25LS being the one closest to the viewer. All of the limit switches are supported on brackets secured to the bracket 150. The limit switch 25LS is adapted to be operated by a plunger 212 cooperating at its upper end with a conical surface on a rod 213 attached to the yoke 175. Accordingly, when the arm is in its Park position as shown in FIG. 8, the limit switch 25LS will be held operated to signify that the arm is in this position. Limit switch 24LS is operated by a plunger lying immediately behind the plunger 212 and cooperating with a cam portion 214 formed on a rod 215 which is also secured to the yoke 175. Hence, operation of the limit switch 24LS signifies that the double arm is in its Mid position. The limit switch 23LS, which senses the Fully Extended position of the arm 145, is also arranged to be operated by a plunger like the plunger 212 but, in this case, the plunger enters the forward end of the cylinder 166 through an appropriate seal where it is in position to be operated by the beveled forward end of the piston 172 when the piston rod 173 is fully extended.

As further shown in FIG. 8, a group of limit switches 8LS, 27LS and 6LS are provided for sensing the Drum, Wait and Interchange positions of the single arm 115. To this end, the limit switch plungers are arranged to overlie the forward ends of three pivoted levers 216, 217 and 218. At its rear end the lever 216, which is arranged to actuate limit switch 8LS, lies in the path of travel of a cam projection 219 on the shaft 116. Thus, when limit switch 8LS is actuated, it signifies that the arm is in the Drum position. In a similar manner, the rear end of lever 217 lies in the path of travel of a cam projection 220 on the shaft 116 so as to actuate limit switch 27LS and signify that the single arm is in the Wait position. The rear end of lever 218 is arranged to be actuated by a cam projection 221 on the shaft so as to actuate limit switch 6LS and signify that the single arm is in the Interchange position.

Referring to FIG. 3, the position of the piston 135 is indicated by limit switches 10LS and 7LS, the former being arranged for actuation by the disc 132 when the piston is in its lowered position while the limit switch 10LS is arranged to be actuated by the disc when the piston is in its elevated position.

Figure 11:
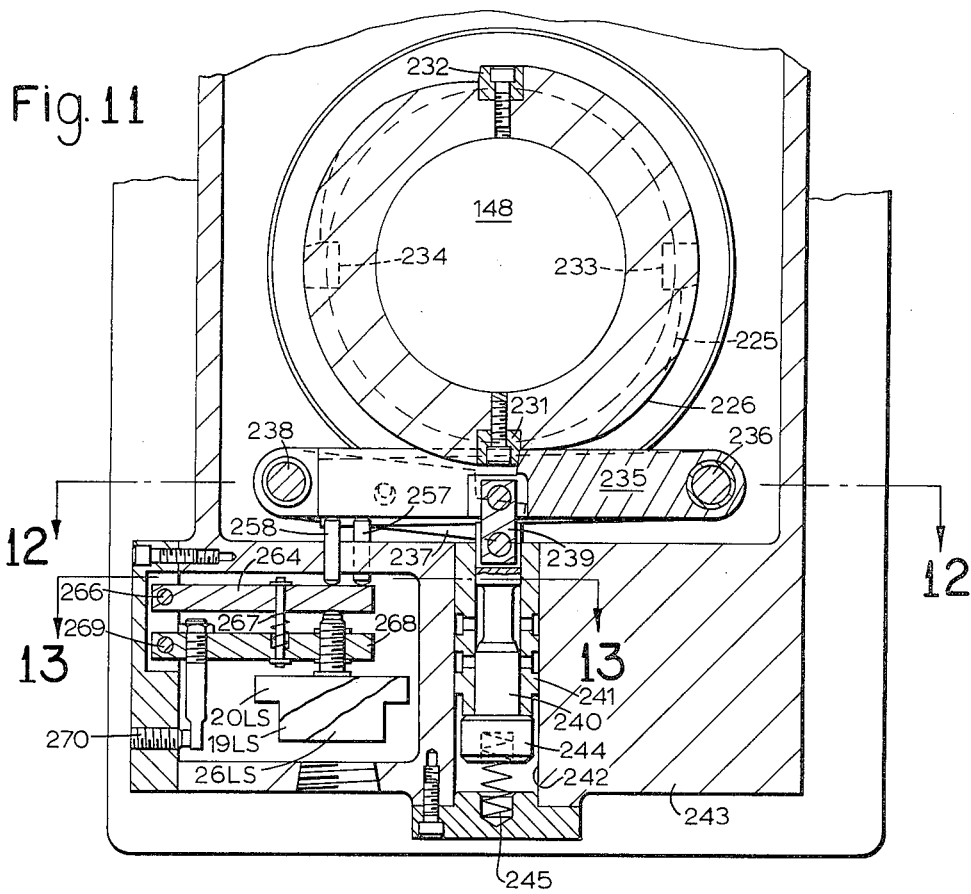
FIG. 11 is a cross-sectional view taken along the line 11—11 in FIG. 8.

Also secured to the rear end of the shaft 148 (FIG. 8) by the key 156, is a pair of stop cams 225 and 226 which are held in spaced relation by a cam ring 227 which supports two rows of limit switch operating cams 228 and 229. In each row there are three pins spaced 90° apart, the pins in one row being shifted 180° from the pins in the other row. The cams and cam ring are held in place on the shaft by a nut 230. As shown in FIG. 11, the stop cam 226 has secured thereto a pair of stop blocks 231 and 232 located 180° apart while the stop cam 225 has a similar pair of blocks 233 and 234 also located 180° apart. The blocks 231 and 232 are arranged to cooperate with a stop arm 235 pivoted at one end on a stationary pin 236. In a similar manner, the stop blocks 233 and 234 are arranged to cooperate with a stop arm 237 pivoted on a pin 238.

Figure 12:
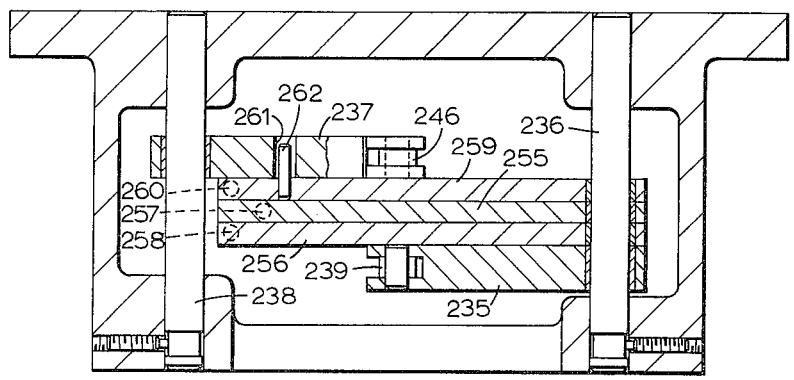
FIG. 12 is a cross-sectional view taken along the line 12—12 in FIG. 11.

As shown in FIGS. 8, 11 and 12, the stop arm 235 is connected by a pivoted link 239 with the upper end of a valve spool 240. The valve spool is received in a valve bushing 241 pressed into a bore 242 formed in a valve block 243. At its lower end, the spool 240 is provided with a piston 244 which has a loose fit in the bore 242 and which is urged upwardly by a compression spring 245. Thereby, the piston and valve spool are normally held in their raised positions and the stop arm 235 is urged into contact with its associated cam 226.

In a similar manner, the stop arm 237 is connected by a pivoted link 246 (FIG. 12) with the upper end of a valve spool 247 (FIG. 8) which is received in a bushing 248 pressed into a bore 249 in the valve block 243. At its lower end, the spool is provided with a piston 250 which has a siding but leak-proof fit in the bore 249 and which is urged upwardly by compression spring 251. Thereby, the piston and valve spool are urged upwardly to move the stop arm 237 into engagement with its associated cam 225. However, the bore 249 is provided with a port 252 whereby fluid under pressure may be applied above the piston 250 to move it downwardly to the position shown in FIG. 8 against the urgency of the spring 251. The bottom of the bore 249 is connected by a port 253 with the bottom of the bore 242 and a port 254 also connects the bottom of the bore 249 with the drain. The hydraulic connections to the valves and to the port 252 will be described in connection with the hydraulic diagram shown in FIG. 15.

Figure 13:
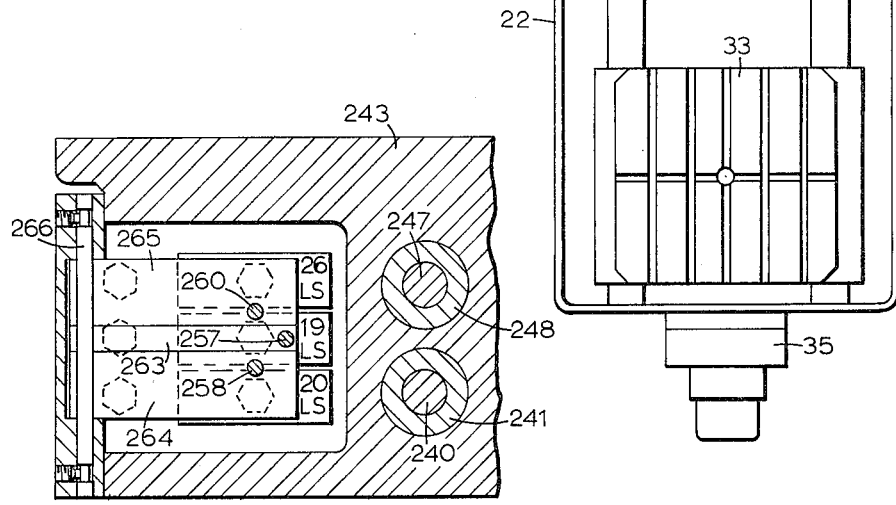
FIG. 13 is a cross-sectional view taken along the line 13—13 in FIG. 11.

As shown in FIGS. 8 and 12, a pair of limit switch actuating levers 255 and 256 are arranged for cooperation with the cam projections 228 and 229 provided on the ring 227. Each of the levers 255 and 256 is pivoted at one end on the pin 236 and has its free end overlying actuating pins 257 and 258, respectively. A third lever 259 similar to the levers 255 and 256 is also pivoted on the pin 236 with its free end overlying an actuating pin 260. The lever 259, however, is arranged to be actuated by the stop arm 237 which is provided with a transverse hole 261 for receiving a pin 262 mounted in the lever 259. Hence, whenever the stop arm 237 is pulled downwardly by the piston 250, the lever 259 will be operated to actuate the pin 260. As shown in FIGS. 11 and 13, the actuating pins overlie a series of operating arms 263, 264, and 265 all of which are pivoted on a rod 266 and all of which are urged upwardly into contact with their associated actuating pins by compression springs 267 as shown in FIG. 11.

The operating arms 263, 264 and 265 overlie the operating plungers of limit switches 19LS, 20LS and 26LS which are supported, as shown in FIG. 11, on individual adjusting arms 268 pivoted on a rod 269 and provided with an adjustment screw 270.

Figure 15:
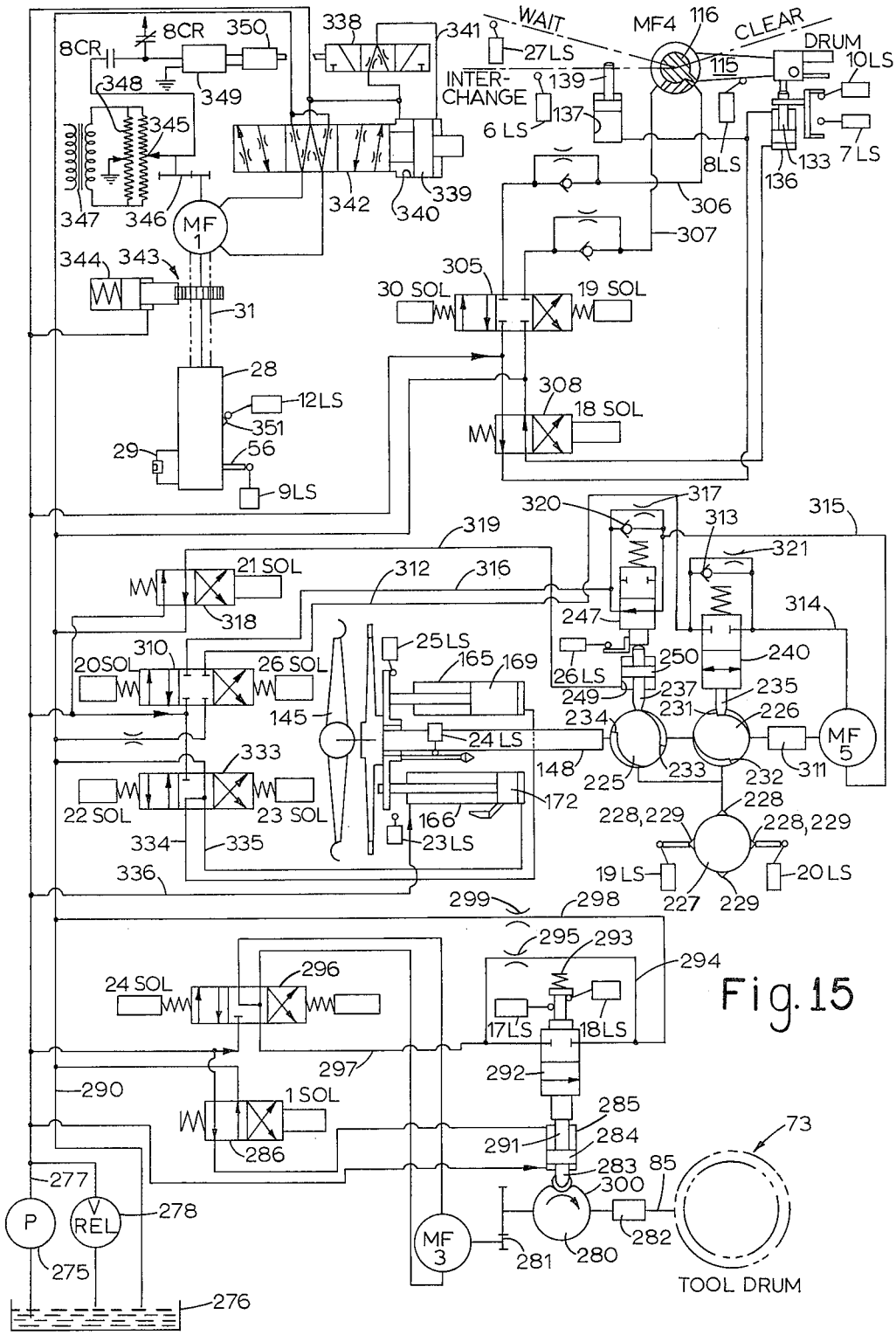
FIG. 15 is a diagrammatic view showing the hydraulic circuit of the automatic tool change mechanism shown in the preceding figures.

The various hydraulic operating devices of the tool change mechanism and related portions of the machine tool are connected in a hydraulic circuit which is shown diagrammatically in FIGS. 15 and 16. Referring first to the circuit shown in FIG. 15, operating pressure is provided by a pump 275 which is adapted to be driven by a prime mover (not shown). The pump withdraws fluid from a reservoir 276 and supplies it at high pressure to a line 277 which is connected back to reservoir through a relief valve 278 which sets the pressure in the line 277. Considering first the drive for the tool drum 73, there is provided a hydraulic motor MF3 which is arranged to drive a cam 280 through suitable gearing 281. The drive is extended from the cam to the drive shaft 85 (FIG. 6) through reduction gearing 282. The reduction gearing should be such that for each revolution of the cam 280, the tool drum 73 will be rotated through an arc equal to the spacing between adjacent receptacles thereon. In other words, if the drum is provided with 35 receptacles, then the gearing 282 together with the reduction afforded by the spear 84 (FIG. 6) and ring gear 83 should be such as to provide a speed reduction of 35:1.

As indicated in FIG. 15, the cam 280 is provided with a notch which is adapted to receive a roller supported on the end of a shot pin 283. Hence, the notch will move into position to receive the shot pin each time the drum moves through a distance equal to the spacing between adjacent receptacles. The shot pin is adapted to be operated by a piston 284 working in a cylinder 285 which is arranged to be supplied with hydraulic fluid under pressure under the control of a solenoid valve 286. When the actuating solenoid 1SOL for this valve is deenergized, as indicated in FIG. 15, hydraulic fluid under pressure will be supplied from line 277 to the upper end of the cylinder 285. The lower end of the cylinder 285 is connected directly to the pressure line 277 but, due to the differential areas on the piston 284, the shot pin will be urged into engagement with the cam 280. When the notch in the cam moves beneath the shot pin the latter will tend to locate the tool drum with one of its receptacles in the pickup position beneath the single arm 115. When solenoid 1SOL is energized, the valve 286 will be operated to connect the upper end of the cylinder 285 with a reservoir line 290 whereupon the shot pin will be removed from the cam by the pressure applied to the lower end of the cylinder.

The piston 284 is provided with a piston rod 291 which is connected to the spool of a valve 292 which is biased downwardly as viewed in FIG. 15 by a compression spring 293. The valve 292 is provided with two ports which are interconnected by a line 294 containing a throttle valve 295. As indicated in FIG. 15, the position of shot pin 283 is sensed by a pair of limit switches 17LS and 18LS, the former limit switch being actuated when the shot pin is moved away from the cam and the latter limit switch being actuated when the shot pin is seated in the notch of the cam.

Operation of the drive motor MF3 is controlled by a solenoid valve 296 which causes the lines to the hydraulic motor to be short circuited when the valve is in its centered or neutral position as shown in FIG. 15. However, when the valve is shifted to the right by solenoid 24SOL, pressure line 277 will be connected to one side of the motor while the other side thereof will be connected through a line 297 with the valve 292. If, at this time, solenoid 1SOL is energized, the valve 292 will be shifted upwardly to provide a direct connection between line 297 and a line 298 connected to the reservoir line 290. A throttle valve 299 is interposed in the line 298 to permit the speed of rotation of the tool drum to be controlled as desired. When it is desired to stop the tool drum, the shot pin 283 is dropped onto the cam by deenergization of solenoid 1SOL just before the notch in the cam comes beneath the shot pin. The cam is provided with a gradual reduction in diameter in the area indicated by reference numeral 300 so that the valve 292 will gradually close its ports as the notch on the cam approaches the shot pin. This forces a portion of the hydraulic fluid for the motor to flow through the bypass line 294 and throttle valve 295 thereby gradually reducing the speed of the drum. When the shot pin drops into the notch in the cam, the ports are completely closed off and limit switch 18LS is actuated to indicate that the shot pin is seated in the notch. Solenoid 24SOL is also deenergized at this time to stop further rotation of the motor MF3.

The single arm 115 is arranged to be operated by a vane motor MF4 which has a direct driving connection with the shaft 116 on which the arm is mounted. Operation of the vane motor is controlled by a solenoid valve 305 which has a central or neutral position and two operated positions. When the solenoid 30SOL is energized, the valve will be shifted to the right as viewed in FIG. 15 thereby connecting pressure from line 277 to motor line 306 and connecting reservoir line 290 to the motor line 307. Thereby, the arm 115 will be moved from the Drum position to the Wait position where it will be held against further movement by the motor MF4 by piston rod 139.

The flow of fluid to the cylinders 136 and 137 is controlled by a valve 308. When the solenoid 18SOL is energized, the valve 308 will be shifted to the left thereby connecting the cylinder 137 to the reservoir line 290. Thereby, the motor MF4 will be enabled to move the arm to the Interchange position. After interchange of the tools has been effected, the arm may be returned to its rear position by energization of solenoid 19SOL which causes pressure from line 277 to be connected to the motor line 307 while the motor line 306 will be connected to the reservoir line 290. The motor lines 306 and 307 are provided with check valves and parallel connected throttle valves to enable adjustment of the speed at which the arm 115 moves in each direction.

Rotation of the double arm 145 by hydraulic motor MF5 is controlled by a reversing solenoid valve 310. As shown in FIG. 15, this motor is arranged to drive shaft 148, stop cams 225 and 226, and ring 227 through a gear reduction drive 311.

As will later appear in connection with the description of the wiring diagram, the double arm is first rotated through 90° counterclockwise from its vertical position for the purpose of simultaneously engaging the tool in the single arm and the tool in the spindle. This is effected by energizing solenoid 26SOL to shift the valve 310 to the left thereby connecting line 312 with the pressure supply line 277 whereby fluid pressure will be delivered through a check valve 313 to a motor line 314. Hydraulic fluid from the motor will be returned through a line 315 and valve 247, which is now open, to a line 316 which is connected to reservoir line 290. As the arm rotates the valve 247 will gradually close thereby forcing the hydraulic fluid to flow through a throttle valve 317. This will gradually reduce the speed of the arm and enable it to be stopped by the engagement of stop block 233 (FIG. 11) with stop arm 237 without shock. Since FIG. 11 is a rear view of the shaft 148 and of the stop cams assembled thereon, clockwise rotation of the shaft and cams as viewed therein will correspond with counterclockwise rotation of the shaft and cams as viewed from the front of the machine and also as viewed in FIG. 15.

After the tools have been engaged by the double arm, it is moved axially to disengage the tool from the spindle and the single arm after which it is rotated 180° counterclockwise to interchange the tools. This further counterclockwise rotation of the arm is effected by a valve 318. Energization of solenoid 21SOL causes valve 318 to be shifted to the left whereby a line 319 is connected to the pressure line 277. This operates piston 250 and withdraws the stop arm 237 from the block 233 thereby permitting continued counterclockwise rotation of the arm 145 by motor MF5. Again, as the stop arm 237 approaches the stop block 234, the valve 247 will be gradually closed and cause throttling of the exhaust from the motor MF5 through the valve 317.

After the double arm 145 has been moved axially to its Mid position to insert the tools in the spindle and the single arm, the arm is rotated 90° clockwise to return it to the vertical position. This is effected by deenergizing solenoid 26SOL and energizing solenoid 20SOL thereby shifting the valve 310 to the right. This causes line 316 to be connected to the pressure line 277 and causes hydraulic fluid to flow to the motor through check valve 320 and motor line 315. Fluid from the motor is returned through line 314 to the valve 240, which is now open, and thence through line 312 to the reservoir line 290. As the arm rotates clockwise, the stop arm 325 will approach the stop block 232 and the valve 240 will gradually close thereby slowing the movement of the arm to prevent shock when the stop block 232 engages stop arm 235. As the valve closes the hydraulic fluid will be forced to flow through a throttle valve 321 since the check valve 313 will now be closed.

Axial shifting of the double arm 145 is controlled by a solenoid valve 333 which is connected to the cylinders 165 and 166 by motor lines 334 and 335. The forward end of cylinder 166 is permanently connected to the pressure supply through a line 336. Hence, when the valve 333 is in its neutral position, as shown in FIG. 15, in which lines 334 and 335 both are connected with the reservoir line 390, the pressure in the left-hand end of cylinder 166 will move the arm to its fully retracted or Park position. When solenoid 22SOL is energized, the cylinder line 334 will be connected to pressure line 277 thereby porting fluid into the rear end of cylinder 165 and moving the arm to its Mid position. When solenoid 22SOL is deenergized and solenoid 23SOL is energized, the valve 333 will be shifted to the left thereby connecting cylinder line 335 to pressure line 277 thereby causing the differential piston 172 to move all the way to the left and fully extend the arm 145. The arm may be returned to the Mid position by deenergizing solenoid 23SOL and again energizing solenoid 22SOL, or it may be returned to the Park position by deenergizing both solenoids.

Before a tool change can be effected, it is necessary to move the spindle carrier 28 to a tool change position where its spindle 29 will be in proper vertical alignment with respect to the arm 145 on the column. As mentioned earlier, the spindle carrier is arranged to be moved along its ways 27 on the column by a hydraulic motor MF1 which operates a lead screw 31 cooperating with a nut in the spindle carrier. Operation of the hydraulic motor is controlled by a servovalve 338 which controls the movement of a differential piston 339 operating in a cylinder 340. The left-hand side of the piston, which is the small area side thereof, is permanently connected to the pressure line 277 while the right hand side of the piston is connected by a line 341 to the valve 338 whereby varying amounts of pressure may be applied to the right-hand side of the piston and thereby cause movement of a valve 342 to which the piston is connected. Valve 342 is a reversing valve and is adapted to control the direction and speed of rotation of the motor MF1 in accordance with the displacement thereof by the piston 339.

The lead screw 31 is provided with a friction brake 343 which is normally held off by a cylinder 344 connected to pressure line 277. The brake will be rendered operative in case of loss of pressure in line 277 and thereby prevent downward coasting of the spindle carrier 28.

In order to provide automatic positioning of the spindle carrier at the correct location for a tool change operation, a potentiometer 345 is arranged to be driven through gearing 346 from the lead screw 31. The potentiometer is energized from an alternating current source through a transformer 347 which also energizes a manually adjustable potentiometer 348. The wiper of this potentiometer is connected to ground and the wiper of potentiometer 345, which moves in accordance with the vertical positioning of the spindle carrier, is electrically connected through relay contacts 8CR with the input of a servoamplifier 349. This amplifier includes a phase sensitive rectifier which provides a D.C. output which is fed to a torque motor 350 that in turn controls the position of the servovalve 338. Accordingly, when relay 8CR is energized to connect the output from potentiometer 345 with the input of amplifier 349, the wiper 345 will seek an electrical ground as set by the position of the wiper of potentiometer 348. When the spindle carrier 28 has been positioned in this manner at the tool change position, a dog 351 thereon will operate limit switch 12LS and signal correct positioning of the spindle carrier.

In FIG. 16 is shown the hydraulic circuit for controlling the operation of the spindle drive motor MF2. In this circuit, a source of hydraulic fluid under pressure is provided by a pump 355 driven by an electric motor 356 and arranged to withdraw hydraulic fluid from a reservoir 357 and deliver it to a high pressure line 358. This line is connected by a relief valve 359 with the reservoir thereby setting the pressure in the line 358. The line 358 is connected to a solenoid valve 361 which controls the flow of hydraulic fluid to the motor MF2. Thus, when the valve 361 is in its neutral position as shown in FIG. 16, the flow of fluid under pressure to motor lines 362 and 363 is blocked and the motor will remain at rest. However, when solenoid 14SOL is energized, the valve 361 will be shifted to the left thereby connecting fluid under pressure from the line 358 to the motor line 363 to drive the motor in a forward direction. At the same time, motor line 362 will be connected through the valve to a reservoir line 364. It will be understood, of course, that a complete range of spindle speeds may be achieved through a speed change gear box of a conventional type.

In the present circuit, provision has been made for automatically driving the motor MF2 at a reduced speed at the time that the new tool is being inserted in the spindle. This is for the purpose of insuring engagement of the teeth 66 (FIG. 14) on the tool holder with the teeth 65 formed on the driving plate. Toward this end, a solenoid valve 365 has been provided and connected in parallel with the valve 361 for controlling the flow of fluid to the motor MF2. In the case of the valve 365, however, a pressure reducing valve 366 is inserted in the pressure line 358 ahead of the valve 365 so that the motor will be operated at low speed in a forward direction whenever the solenoid 16SOL is energized to shift the valve to the left.

*Electrical control circuit*

The wiring diagram for the electrical control circuits for the tool change mechanism is shown in FIGS. 18a–18g, 19 and 20 of the drawings. In this diagram, the lines are numbered along the left-hand margin to provide a reference system for enabling the various contacts and components to be readily located. The legends provided along the right-hand margin designate the functions of the control relays and the numbers beneath the legends indicate the location of the contacts of each relay. The underscored numbers designate normally closed contacts.

Referring to FIG. 18a, the circuit is connected to a source of three-phase alternating current by means of terminals 370. The draw bar motor 4M (line 2) is a three-phase reversible motor which is connected to the terminals 370 through forward and reverse relay contacts 4MF and 4MR, respectively. One phase of the three-phase input is connected to the primary winding of a transformer 371 the secondary winding of which has one terminal connected to a grounded conductor 372 and the other terminal connected to a master relay 1R through stop and start push buttons 373 and 374, respectively. Accordingly, when push button 374 is depressed, relay 1R will be energized and close its contacts in line 4 and 8 thereby latching in the relay and connecting a conductor 375 to the ungrounded side of the secondary winding of transformer 371.

The draw bar motor may be operated manually by push buttons 376 and 377 which control the energization of relays 4MF and 4MR. Thus, when push button 376 is depressed, relay 4MR will be energized to operate the draw bar motor in a reverse direction to pull in the draw bar and tighten the tool in the spindle. When push button 377 is depressed, relay 4MR will be deenergized and relay 4MF will be energized to operate the draw bar motor in a forward direction to release the tool in the spindle.

Figure 18B:
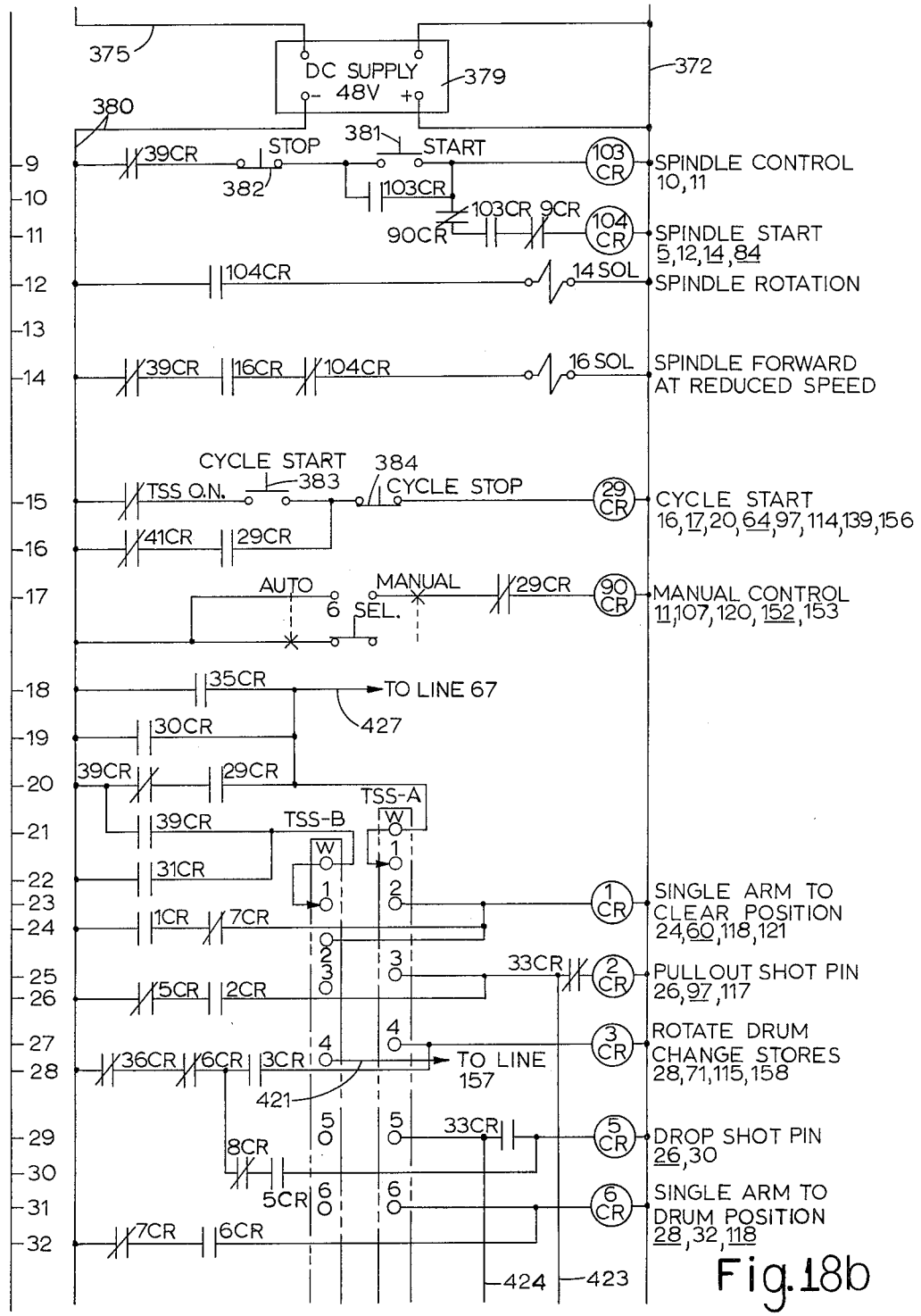
Figure 18C:
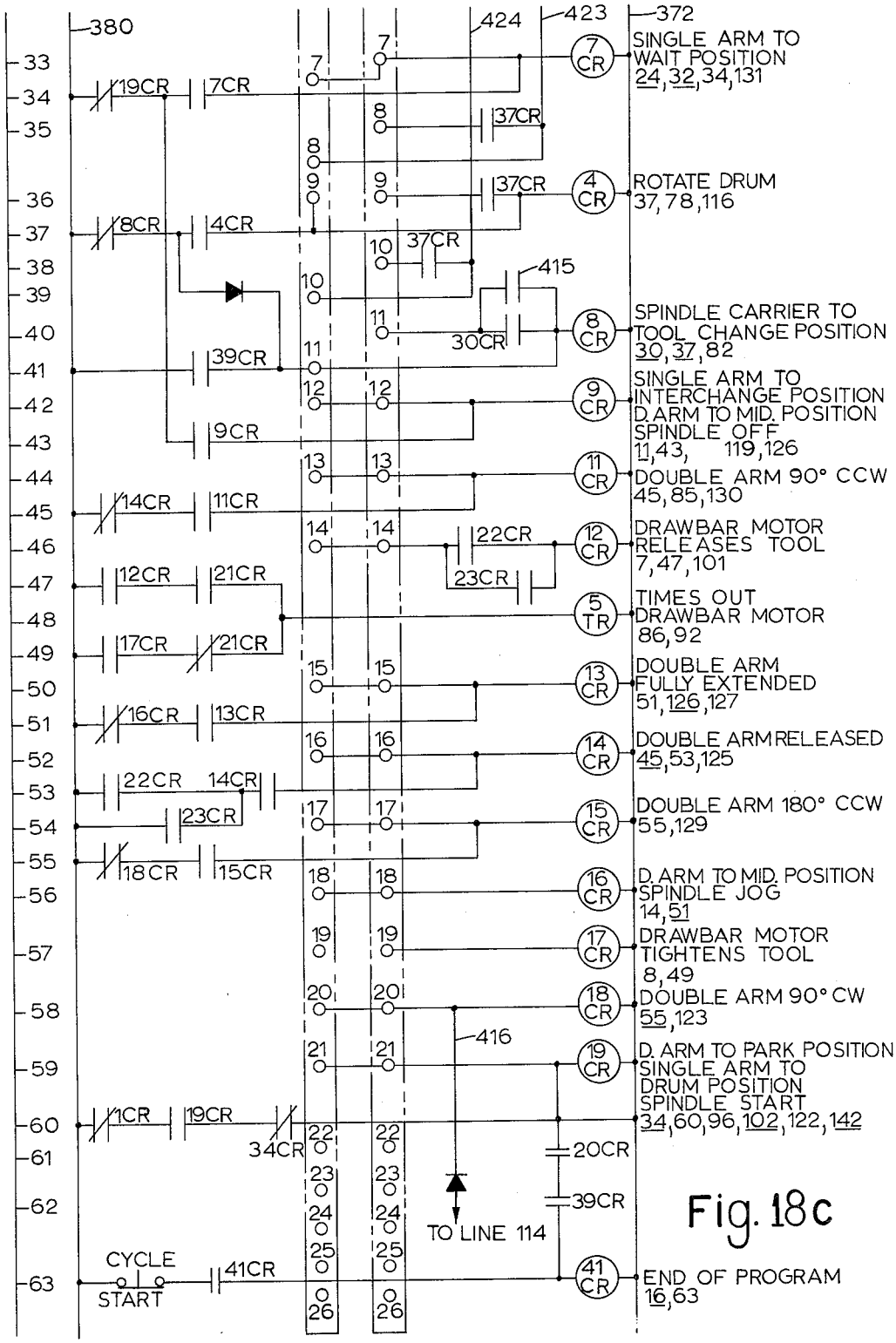

Referring now to FIG. 18b, when the line 375 is energized a direct current supply 379 will be energized and supply direct current to the conductors 372 and 380. As will be more clearly understood as the description proceeds, the energized conductors 372 and 380 provide a source of energizing potential for the various control relays, stepping switches, and solenoids which are utilized to control the operation of the tool change mechanism.

To condition the spindle for operation, a push button 381 (line 9), when depressed, will energize a relay 103CR which will be latched in through its own contacts in line 10. This relay also has contacts in line 11 which will be closed upon energization of the relay to energize a spindle start relay 104CR which will thereupon close its contacts in line 12 and energize solenoid 14SOL. As previously described in connection with FIG. 16 of the drawings, this solenoid causes the spindle to be rotated by the hydraulic motor MF2. A manual control is also provided for stopping the spindle, this control comprising a push button 382 in line 9 which, when depressed, deenergizes relay 103CR and thereby relay 104CR and solenoid 14SOL. The energization of solenoid 16SOL for effecting rotation of the spindle at reduced speed is effected automatically as will hereinafter be described.

Automatic cycling of the machine tool is initiated by the depression of a push button 383 in line 15 which energizes a cycle start relay 29CR. This relay will be latched in through its own contacts in line 16 and will remain energized until the conclusion of a machining program or until a cycle stop push button 384 is depressed.

The system is also provided with an Auto-Manual control switch 6SEL (line 17) for enabling the tool change mechanism to be operated manually by the operator of the machine tool. Switch 6SEL is a manually operated, two position switch which is shown in FIG. 18b in the Auto position wherein the manual control relay 90CR is deenergized. However, when the switch is moved to the Manual position, this relay will be energized and permit manual control as will hereinafter be described.

The electrical control system for the automatic tool change mechanism is adapted to effectuate three different types of tool change sequences. These will hereinafter be referred to as the first time through sequence, the normal sequence, and the last time through sequence. In a normal tool change sequence, the number of the next tool required is read from the tool number code on the tape during a machining operation and entered into one of the two tool number stores provided in the control unit. The tool drum then is revolved to bring this tool into the pickup position whereupon the single arm removes the tool from the drum and transfers it to the Wait position. The other tool number store which contains the number of the tool presently in the spindle then is selected and the drum is rotated to bring the receptacle for this tool to the pickup position. At the conclusion of the machining operation, if a tool change has been called for by the preparatory function code on the tape, the spindle carrier will move to the tool change position and the spindle will be stopped. The single arm then will move to the Interchange position and the double arm will interchange the tool in the spindle with the tool carried by the arm. The single arm then will return the old tool to its receptacle in the drum, the spindle will be turned on, and the machine then will be ready to execute the next machining operation with the new tool in the spindle. When the next tool number is read from the tape, it is entered into the store which previously contained the number of the tool returned to the drum. This now becomes the new tool number and the other store continues to retain the number of the tool presently in the spindle. After the new tool number is entered in the store, the single arm will be moved to the Clear position and the drum will be rotated to bring the new tool into the pickup position. The single arm will then remove the tool and carry it to the Wait position where the tool change cycle is interrupted until such time as a signal is received from the machine that the machining operation has been completed and the tool change can now take place.

The first time through sequence is provided to take care of the situation in which all of the tools are in the drum and the spindle is empty. In this case, it is unnecessary to make provision for returning the old tool to the drum. Hence, the tool change cycle is modified to eliminate repositioning of the drum after the new tool has been removed and carried to the Wait position. Otherwise, the cycle remains the same as in the normal tool change sequence.

The last time through sequence is utilized to remove the last tool from the spindle and return it to its proper place in the drum. Since it is not required that a new tool be removed from the drum, there is no need to rotate drum at the outset of the tool change cycle for the pick up of a new tool. It is necessary, however, to change the tool number store since the store selected at the beginning of the tool change cycle is the one corresponding to the old tool which was put away at the end of the preceding cycle. Therefore, the tool number store is changed and the single arm is moved without any tool therein to the Wait position. The drum is then rotated to the position called for by the number in the tool number store which is the same as that of the tool in the spindle. When the final machining operation is concluded, the tool in the spindle is removed by the double arm and placed in the single arm which returns it to its proper place in the drum.

At the outset of a machining program, the drum 73 must, of course, be loaded with the tools which will be needed to perform the various machining operations required to be carried out on the workpiece secured to the table 33. Movements of the table will not be discussed herein since this portion of the control system forms no part of the present invention. The previously prepared record material, such as a strip of punched tape, is placed in the tape reader and the Cycle Start push button 383 (line 15) is depressed to start the reading cycle. The first block of information on the tape consists only of a sequence number and a tool number whereas the second and succeeding blocks contain full information such as sequence number; preparatory functions, including tool change, type of machining cycle, etc.; slide positions and feeds; spindle speeds; tool number; and miscellaneous functions. Hence, when the Cycle Start button is depressed, the sequence number will first be read into the control unit and then the tool number. After the last digit of the tool number has been read, a relay 56CR (line 140, FIG. 19) will be picked up thereby closing its contacts in line 66. This energizes a tool change stepping switch TSS (64) through its own interrupter contacts in line 64 and steps the wiper associated with each of the banks TSS–A to D of this switch from its home position on stud #1 to its first active position on stud #2. The A and B banks (line 21) of this switch may be termed the "action" banks since they determine the energization of the relays which control the movements of the machine. The C and D banks (line 65) may be termed the "feedback" banks since they are arranged to receive a feedback signal from the machine each time the movement called for has been completed. This signal tells the control circuit to go ahead with the next step in the tool change cycle and the stepping switch TSS is advanced to the next stud.

On the first cycle of operation of the tool change mechanism, a tool having a number corresponding to that read from the first block of tape is taken from the drum and placed in the spindle. As previously mentioned, since there is no tool in the spindle at this time it is unnecessary on the first time through sequence to make provision for returning the old tool to its proper location in the drum. For this reason, a first time through relay 37CR (114) is not picked up until the end of the first tool change cycle. However, once this relay is energized, it will remain energized until the end of the machining program.

When the Cycle Start relay 29CR (15) is energized, its contacts in line 20 will be closed thereby connecting the wiper of bank A of stepping switch TSS to the conductor 380. Hence, when the wiper moves onto stud #2, relay 1CR (23) will be energized and will close its contacts in lines 24, 118, and 121. The relay will be held energized by its contacts in line 24 and solenoids 18SOL and 19SOL will be energized. As a result, the vane motor MF4 will be operated to move the single arm 115 toward the drum and the plunger 133 will be moved upward to locate the arm in the Clear position. With the plunger in its raised position, limit switch 7LS (FIG. 15) will be operated and close its contacts in line 68. This will connect stud #2 of bank TSS–C with the conductor 380 and complete a circuit to stepping switch TSS through the wiper of bank TSS–C, normally closed contacts of relays 31CR and 39CR (64), wire 388 and TSS interrupter contacts (64). Thereby, the stepping switch TSS will be stepped onto stud #3 and cause relay 2CR (25) to be energized. The contacts of this relay in lines 26 and 117 will be closed to provide a holding circuit for the relay and energize solenoid 1SOL, respectively. This causes the shot pin 283 to be lifted from the cam 280 and operates limit switch 17LS (FIG. 15). The contacts of this limit switch in line 69 are thereby closed to connect stepping switch TSS to the conductor 380 through the wiper of bank C and through its own interrupter contacts in line 64. The stepping switch thereupon advances its wiper to stud #4 where relay 3CR (27) is energized through the wiper of bank TSS–A. Accordingly, the contacts of this relay in lines 28, 71, 115, and 158 are closed thereby latching in the relay, energizing solenoid 24SOL, cocking stepping switch 11SS (158, FIG. 20) and advancing stepping switch TSS to stud #5. Energization of solenoid 24SOL causes the hydraulic motor MF3 to be activated and rotate the tool drum 73.

The drum will continue to rotate until relay 5CR (29) is energized whereupon the normally closed contacts of this relay in line 26 will open and drop relay 2CR and the shot pin 283 so as to stop the rotation of the drum. Relay 5CR will be energized when coincidence relay 33CR (151, FIG. 20) is energized to indicate that the tool whose number corresponds to the tool number read from the tape is in the pickup position. This is accomplished by comparing the number sensed by the reading head 111 with the previously stored tool number.

A block diagram of the tool selector portion of the control system is shown in FIG. 17. As herein shown, a punched tape 390 is threaded through a tape reader 391 where the instructions encoded thereon are read out and transmitted to a decoder and distributor 392. Here, the data is decoded and transmitted to the various utilization circuits such as the tool number stores 393 and 394 which, for convenience, are designated as Store A and Store B. On each tool change cycle, these stores are alternately connected to a tool selector unit 396 where the tool number in the store is compared with the tool number sensed by the reading head 111. When coincidence is obtained, that is, when the tool number in the store, for example Store A, matches that sensed by the reading head, a signal is transmitted to the shot pin 283 which engages the notch in the cam and stops rotation of the drum. The drum is next positioned to receive the old tool from the spindle under the control of the other store, for example Store B, and the next tool number read off the tape is entered in Store B and becomes the new tool number. On the next tool change, the drum is positioned in accordance with the new tool number in Store B to select the next tool to be placed in the spindle. After the new tool has been removed from the drum, the drum is repositioned in accordance with the tool number in Store A which is the number of the old tool in the spindle. The next tool number from the tape is entered in Store A ready for the next tool change cycle when Store A is selected first and then Store B.

Figure 19:
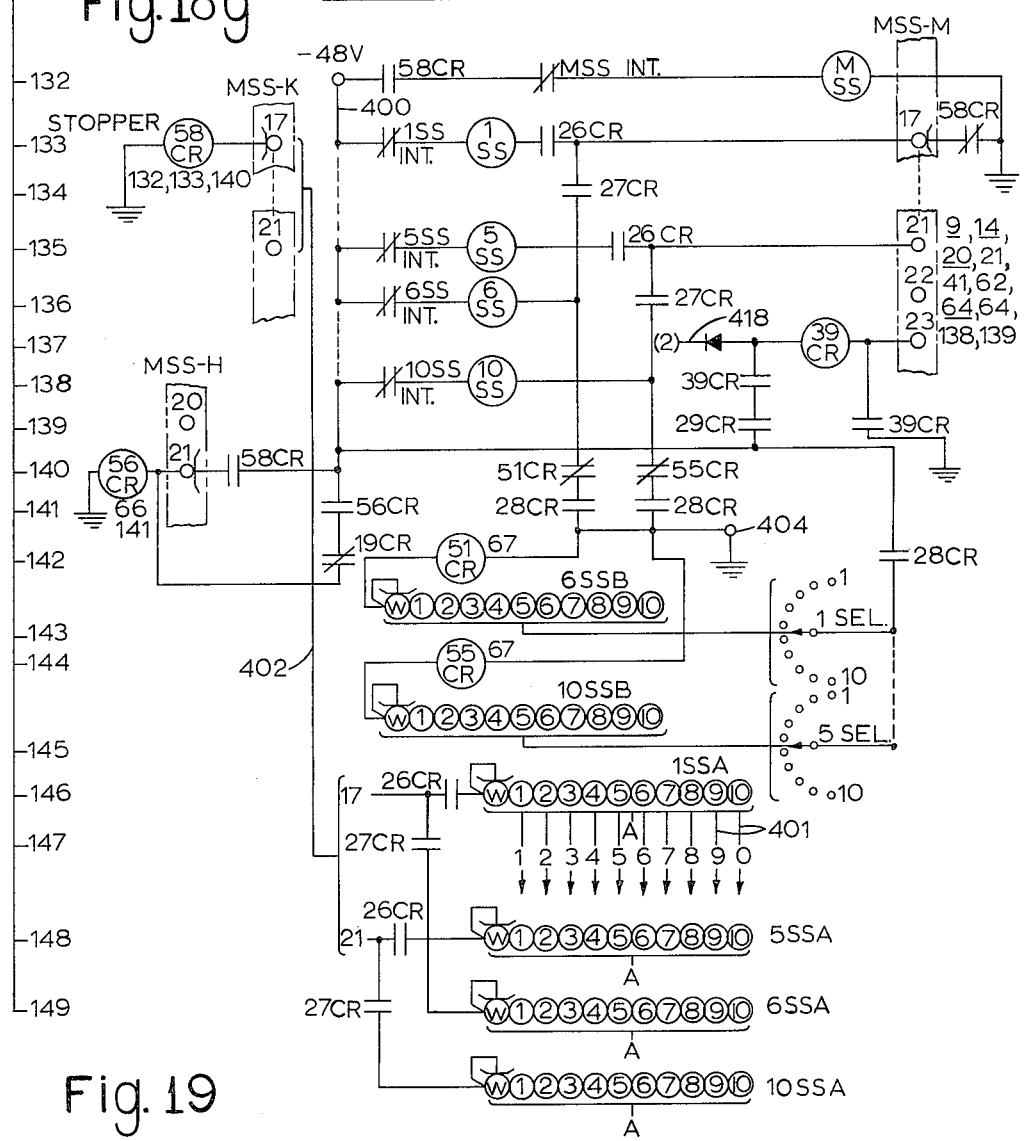

Referring now to FIG. 19, Store A is comprised of a plurality of stepping switches, there being one stepping switch for each digit in the tool number. In the present example, provision is made for handling five-digit tool numbers so that Store A includes stepping switches 1SS to 5SS, inclusive, and Store B includes stepping switches 6SS to 10SS, inclusive. In order to conserve space, however, only the stepping switches 1SS, 5SS, 6SS and 10SS and their associated banks have been shown in FIG. 19.

As each line of tape containing the tool number is read, i.e., as each digit of the tool number is read, one stepping switch of Store A or B, whichever is selected, is stepped to a position corresponding to the value of the digit read from the tape. As each stepping switch is positioned, a signal is provided to advance both the tape and also a master stepping switch MSS (132) one step to cause the data in the next line to be read and entered into the next stepping switch of the store until the store is completely filled.

The stores A and B are selected alternately under the control of stepping switch 11SS (155). As the wiper of bank 11SS–B (152) is stepped from home onto stud #1, relay 26CR (155) will be energized to select Store A. When the wiper is moved to stud #2, relay 27CR is energized to select Store B. This alternate selection of the stores is continued as the stepping switch is advanced from one stud to the next.

Assuming that Store A is selected and that relay 26CR is energized, then, with the wipers of banks MSS–K (132) and MSS–M (132) of the master stepping switch on studs #17 of their respective banks, stepping switch 1SS will be energized from conductor 400 and will run self-interrupted until stopper relay 58CR (133) is energized to open its contacts in line 133. Relay 58CR will be energized when the wiper of bank 1SS–A (146) contacts a stud which has been connected by the decoder 392 to the —48 volt source. The letter A applied to each of the banks 1SS–A to 10SS–A (145–149) is used to indicate a cable containing 10 wires 401 which serves to connect the 10 studs of the stepping switch banks with the corresponding 10 output terminals of the decoder. In a similar manner, numeral 402 indicates a cable containing 5 wires which serve to connect the studs #17 to #21 of bank MSS–K with the wipers of the stepping switch banks 1SS–A to 5SS–A and 6SS–A to 10SS–A. When relay 58CR is picked up, it not only will stop stepping of 1SS but will also close its contacts in line 132 and cause the master stepping switch MSS to step to the next stud, i.e., #18. Relay 58CR will be deenergized when the wipers move off of stud #17 thereby limiting stepping switch MSS to one step. The stepping switch 2SS will now run self-interrupted until it reaches a stud in bank 2SSA which, like bank 1SSA is connected through contacts 26CR and a wire in cable 402 to stud #18 in bank MSS–K. When the wiper of bank 2SS–A reaches a stud energized by the decoder it will stop due to energization of stopper relay 58CR and the master stepping switch MSS will advance to the next stud, i.e. #19. This procedure will be continued until all of the stepping switches 1SS to 5SS have been positioned in accordance with the digits of the tool number read from the tape. When the stopper relay 58CR is energized with the wiper of bank MSS–K on stud #21, relay 56CR will be energized so as to indicate that entry of a new tool number in the store has been completed.

In the event that Store B is selected instead of Store A, relay 27CR will be energized and relay 26CR will be deenergized. Hence, stepping switches 6SS to 10SS now will be connected to the studs #17 to #21, inclusive, of bank MSS–M and banks 6SS–A to 10SS–A of these switches will be filled in the same manner as described above in the case Store A.

Provision has been made for filling one of the stores manually, in this case Store B. This is effected under the control of relay 28CR (155) which, when energized, disconnects the wiper of bank 11SS–B from the source 403 of energizing potential and arbitrarily connects relay 27CR to the source 403. The contacts 28CR in line 141 will thus be closed and connect the stepping switches 6SS to 10SS, inclusive, to the ground terminal 404. This will cause the stepping switches to run self-interrupted until the stopper relays 51CR to 55CR, inclusive (142–144) are energized to open their contacts in line 140. The stopper relays are connected in an energizing circuit which may be traced from the conductor 400 through contacts 28CR (142), wipers of manual selector switches 1SEL to 5SEL, stepping switch banks 6SS–B to 10SS–B, relay coils 51CR to 55CR, and ground terminal 404. Hence, the wipers of the stepping switch banks 6SS–B to 10SS–B will seek out the stud that is connected to the —48 volt source by the selector switch 1SEL to 5SEL, inclusive, and will stop on that stud. The stopper relays also have normally open contacts in line 67 which provide a feedback signal from bank TSS–C telling it that entry of a tool number into the store has been completed.

It will thus be seen that when relay 28CR is energized by closing of contacts 90CR in line 153, the tool number set up on manual selector switches 1SEL to 5SEL will immediately be transferred into Store B.

Figure 20:
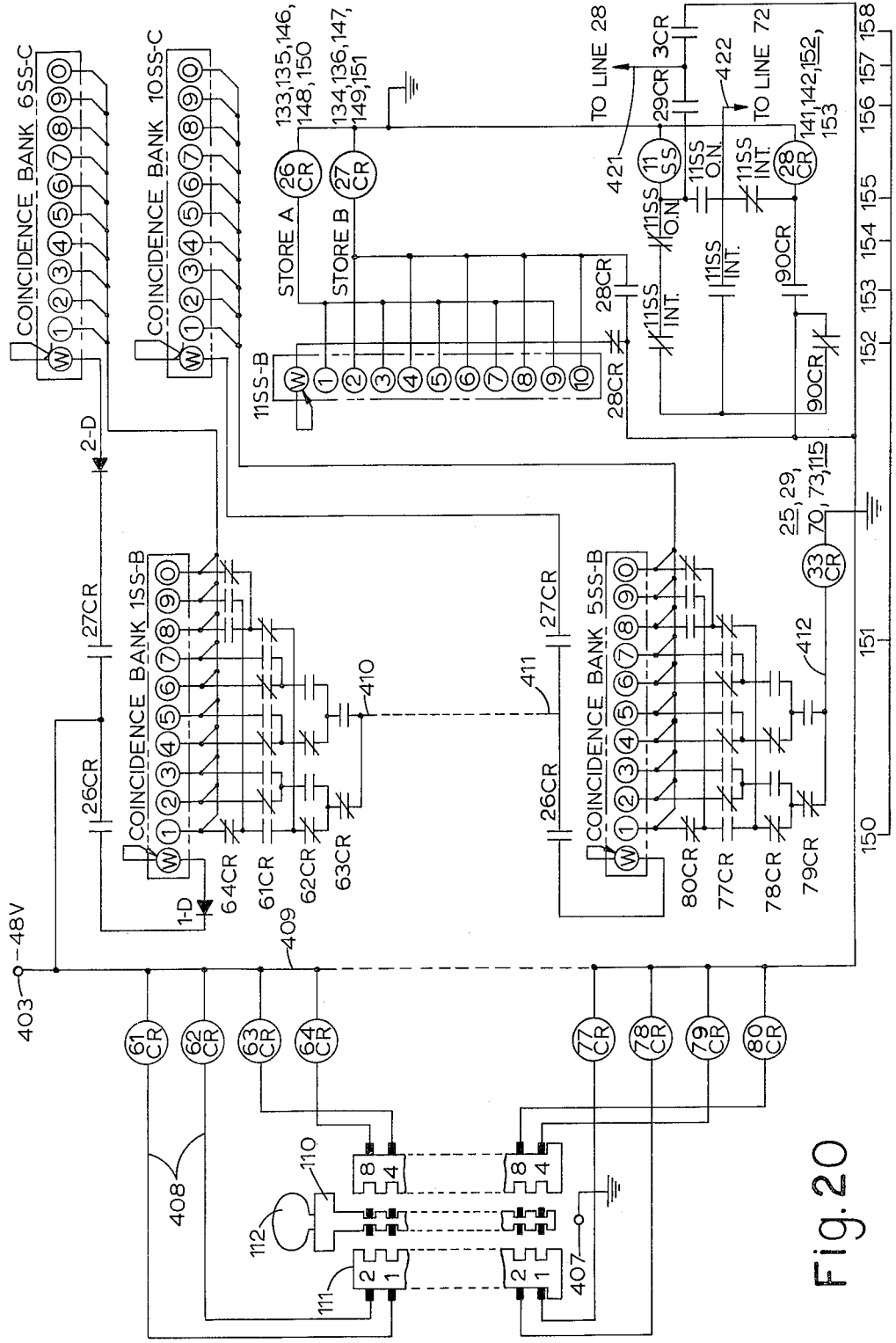

The stepping switch stores also have coincidence banks 1SS–B to 5SS–B and 6SS–C to 10SS–C which, as shown in FIG. 20, have their studs connected to relay trees which serve to decode the tool number information transmitted by the reading head 111. As each key cartridge 110 passes the reading head, the actuators projected by the coded key in the cartridge strike contact slides in the reading head and thereby connect the selected leads 408 to the ground terminal 407. As indicated in FIG. 20, the key 112 and reading head 111 shown therein for purposes of illustration, utilize a binary coded decimal system of enumeration for the five digit tool number. Thus, the key is provided with four teeth or projections for each digit of the number, these teeth having the binary coded decimal values 1, 2, 4 and 8 assigned thereto for this purpose. Zeros in the tool number are expressed by an absence of teeth in the appropriate section of the key. Each group of four contacts is connected by wires 408 to four relays which are also connected to the conductor 409. Hence, each group of relays will be energized in accordance with the binary coded decimal values recorded on the key when the cartridge passes the reading head. In the present system, the highest order digit of this tool number is decoded by relays 61CR to 64CR while the lowest order digit is decoded by relays 77CR to 80CR. When the tool number sensed by the reading head coincides with the tool number contained in Store A, for example, a circuit will be established from the conductor 409 to relay 33CR in the following manner: conductor 409 to wiper of bank 1SS–B now resting on a stud representing the highest order digit of the number in Store A. As this digit now coincides with the digit decoded by the relay tree connected to the studs of bank 1SS–B, the circuit proceeds to wire 410. The intermediate banks of Store A have been omitted since they are identical with the two banks 1SS–B and 5SS–B shown herein. Thus, for a two digit number, the wire 410 would be connected directly to wire 411 of bank 5SS–B and, since the wiper of this bank rests on the stud representing the lower order digit in Store A, and since this digit corresponds to the digit decoded by the associated relay tree, the circuit is completed to wire 412 and thence to relay 33CR. If Store B is selected instead of Store A, relay contacts 27CR will be closed instead of contacts 26CR and banks 6SS–C to 10SS–C now will be connected in the circuit with the relay trees in place of the banks 1SS–B to 5SS–B.

Returning now to the tool change cycle, when coincidence is established, relay 5CR will be energized and will be latched in through the normally closed contacts of relays 36CR (28), 6CR and 8CR. At the same time, contacts 5CR in line 26 will open and drop out relay 2CR. Since coincidence was established, the normally closed contacts of relay 33CR (25) will also be open to further insure dropping of relay 2CR.

It will be noted that the contacts 33CR in line 25 will prevent the relay 2CR from being picked up in the first place if the drum should happen to be in the correct position for selection of the new tool.

Deenergization of relay 2CR causes solenoid 1SOL to be deenergized thereby permitting the shot pin 283 to engage the cam 280 and stop the tool drum. When the shot pin is fully engaged with the notch in the cam, limit switch 18LS (FIG. 15) is actuated and closes its contacts in line 73 whereby relay 36CR (72) is energized and opens its contacts in line 28 thereby dropping out relays 3CR and 5CR. Deenergization of relay 3CR also deenergizes solenoid 24SOL (115) thereby cutting off motor MF3 to stop the tool drum. Contacts 3CR (158) will open and deenergize stepping switch 11SS so as to advance the wiper of bank 11SS–B to the next stud. This will cause the other tool store containing the old tool number to be selected. Energization of relay 36CR also closes its contacts in line 73 to advance the stepping switch TSS to stud #6.

It will be observed, as the description proceeds, that only one change of the tool store takes place on each tool change cycle. This results from the fact that the store containing the old tool number, which is selected on stud #5, is filled with the new tool number on the next reading of the tape and remains selected at the beginning of the next tool change cycle to stop the drum at the location of the new tool.

On stud #6, relay 6CR is energized and latched in by its own contacts in line 32. Solenoid 18SOL (118) will thereby be deenergized and lower the plunger 133 (FIG. 15) to permit the arm 115 to engage the new tool in the drum. When the plunger is down and the arm is in the Drum position, the contacts of limit switches 8LS and 10LS (74) are both closed and cause the stepping switch TSS to be moved to stud #7. Here, relay 7CR is energized and is latched in through its own contacts in line 34. At the same time, the contacts 7CR in line 24 open and drop out relay 1CR and thereby solenoid 19SOL. Solenoid 30SOL is energized by the closure of contacts 7CR in line 131 which activates the vane motor MF4 and moves the arm carrying the new tool to the Wait position. The normally closed contacts 7CR in line 32 also open thereby deenergizing relay 6CR. When the arm 115 is in the Wait position, limit switch 27LS will be operated thereby closing its contacts in line 75 and causing stepping switch TSS to step to stud #8. Since relay 37CR is not picked up until near the end of the first tool change cycle, the contacts of this relay in line 35 are open while the contacts thereof in line 77 are closed. Hence, the stepping switch TSS will step immediately to stud #9 without any further action. On studs #9 and #10 the conditions are the same and the wipers are automatically advanced to stud #11. The circuit is designed to skip over studs #8, #9 and #10 on the first time through the cycle since these studs control the repositioning of the drum to receive the old tool from the spindle.

On stud #11, the system awaits a signal from the machine that the machining operation has been completed and that the old tool in the spindle should be interchanged with the new tool carried by the single arm. This signal is furnished by the closing of contacts 415 (39) which causes relay 8CR to be energized. The contacts of this relay shown in FIG. 15 will cause a preset voltage from potentiometer 348 to be applied to the Y-axis servo-amplifier 349 and thereby move the spindle carrier to the tool change position. When the carrier arrives at this position, limit switch 12LS will be operated and close its contacts in line 82 thereby causing stepping switch TSS to step to stud #12. Here, relay 9CR is picked up and latched in by its contacts in line 43. At the same time contacts 9CR in line 119 are closed and energize solenoid 18SOL which removes pressure from the plunger 139 (FIG. 15) and allows the arm 115 to move to the Interchange position. The contacts 9CR in line 126 are also closed and energize solenoid 22SOL which connects pressure to cylinder 165 and moves the double arm out to the Mid position. The normally closed contacts 9CR in line 11 are opened and drop out relay 104CR which deenergizes solenoid 14SOL (12) and stops the spindle. With the double arm in its Mid position and the single arm in its Interchange position, limit switches 24LS 6LS will be operated to close their respective contacts in line 84 thereby advancing the stepping switch to stud #13.

On stud #13, relay 11CR will be energized and latched in by its contacts in line 45. Also, the contacts 11CR in line 130 will be closed and energize solenoid 26SOL so as to cause the double arm 145 to be rotated 90° counterclockwise to engage the tool held by the single arm. As the double arm turns, limit switches 19LS and 20LS will be released and drop relays 22CR and 23CR. Since the contacts 11CR in line 85 are now closed, the stepping switch TSS will be cycled and its wipers advanced to stud #14. Since either limit switch 19LS or 20LS will be operated in this positon, relay 12CR will be energized enclose its contacts in line 7. This will close a circuit to relay 4MF and cause the draw bar motor 4M (2) to release the tool in the spindle. When the draw bar is released, limit switch 9LS (FIG. 15) will be operated and close its contacts in line 98 to pick up relay 21CR. Thereby, the contacts 21CR in line 47 will close and energize timer relay 5TR whose contacts in line 86 will time closed after sufficient interval has elapsed to insure the release of the tool. Since this is the first time through the cycle, however, with no tool in the spindle, the contacts 37CR in line 87 will remain closed around the delay contacts of relay 5TR and nullify their delaying action. Since either relay 22CR or 23CR is picked up on stud 14, one or the other relays 24CR or 25CR will be energized and close its contacts in lines 86 or 87 to thereby advance stepping switch TSS to stud #15.

On stud #15, relay 13CR will be picked up and latched thereby energizing solenoid 23SOL (127) and deenergizing solenoid 22SOL (126) so as to fully extend the double arm 145 and thereby withdraw the new tool from the single arm. When the arm reaches its forward position, limit switch 23LS will close its contacts in line 88 and advance the stepping switch TSS to stud #16. Here, relay 14CR is picked up and latched and solenoid 21SOL (125) is energized so as to raise stop arm 237 and release the double arm for counterclockwise rotation. Withdrawal of the step arm actuates limit swtich 26LS thereby closing the contacts 26LS in line 89 and advancing the stepping switch to stud #17. On this stud, relay 15CR (54) is picked up and latched and solenoid 26SOL (129) is energized whereby the double arm is rotated 180° counterclockwise to position the new tool in front of the spindle. As the arm rotates, relays 22CR and 23CR are dropped thereby dropping relay 14CR (52) and releasing the stop arm 237 to engage the cam and stop the double arm after 180° rotation. In this position of the arm, the cams 228, 229 will cause whichever relay 22CR or 23CR was not picked up on stud #14 to now be energized and cause timer relay 6TR (105) to be energized. This will occur since either relay 24CR or 25CR was picked up on stud #14 and held energized by the normally closed contacts of relay 19CR in line 102. Accordingly, when the relay 22CR or 23CR is picked up on stud #17, a circuit will be completed to relay 6TR and its contacts in line 90 will time closed and cause stepping switch TSS to be advanced to stud #18.

Relay 16CR is picked up on stud #18 thereby dropping out relay 13CR so as to reenergize solenoid 22SOL and deenergize solenoid 23SOL. The double arm 145 is thereby returned to the Mid position and the tool is inserted in the spindle. The contacts 16CR in line 14 are also closed to energize solenoid 16SOL and cause the spindle to rotate at a reduced speed in the forward direction to insure meshing of the driving teeth on the tool and on the spindle nose. When the arm reaches mid position, the teeth will be fully engaged and limit switch 24LS will be actuated to close its contacts in line 84. The stepping switch TSS will thereupon be advanced to stud #19 where relay 17CR is energized and its contacts in lines 8 and 49 are closed. Thereby, the draw bar will be tightened and the timer relay 5TR will be energized as soon as forward movement of the draw bar is sufficient to release limit switch 9LS and drop out relay 21CR permitting its contacts in line 49 to close. After the contacts 5TR in line 92 have timed closed, stepping switch TSS will be advanced to stud 20 where relay 18CR (58) is energized. Thereupon, relay 15CR and solenoid 26SOL will be deenergized and solenoid 20SOL will be energized to cause 90° clockwise rotation of the double arm after which the arm will be stopped by stop arm 235. Stud 20 of bank TSSA is connected by a wire 416 with relay 37CR (114) so that this relay will be energized and held energized by its own contacts in line 114 and those of the Cycle Start relay 29CR until the end of the program.

When the double arm has reached its vertical position, cams 228 and 229 actuate both limit switches 19LS and 20LS and energize relays 22CR and 23CR (99, 100) causing them to close their contacts in line 93. This energizes stepping switch TSS and advances it to stud #21 where relay 19CR is energized and latched. Contacts 19CR are opened in line 142 to drop relay 56CR and in line 34 to drop relay 9CR and thereby deenergize solenoid 22SOL which causes the double arm to retract to the Park position. Opening of the 19CR contacts in line 34 also drops out relay 7CR and deenergizes solenoid 30SOL (131). The contacts 9CR in line 119 also open to deenergize solenoid 18SOL and lower the plunger 133 (FIG. 15). Hence, closure of contacts 19CR in the 122 energize solenoid 19SOL and effect the return of the single arm and the old tool to the drum. In this position of the arm and plunger, limit switches 8LS and 10LS are operated and close their contacts in line 74. Thereby, when limit switch contacts 25LS in line 96 are closed upon movement of the double arm into Park position, relay 20CR will be energized through the closed contacts of relays 19CR (96), 31CR (95), and wire 417 connected to stud #6 of bank TSS–C. Relay 20CR will be latched in through its own contacts and those of relays 29CR and 2CR in line 97. Relay 20CR provides a signal to other portions of the machine control circuit, not shown herein, saying that the tool change cycle is complete. Deenergization of relay 9CR causes its contacts in line 11 to close thereby energizing relay 104CR and solenoid 14SOL to start the spindle motor MF2 (FIG. 16). Closure of limit switch contacts 8LS and 10LS in line 74 energize the stepping switch TSS through wire 417 and normally closed contacts 30CR (94) to cause advancement of the switch to stud #22. Studs #22 and #26 are all tied directly to conductor 380 and cause automatic stepping of the switch to stud #1.

The stepping switch will remain on stud #1 with relay

37CR (114) energized until relay 56CR (140) is picked up by the entry of a new tool number in Store A or Store B. Upon the occurrence of this event, the switch will be stepped onto the stud #2 and a normal tool change sequence will take place. This sequence will be the same as the first time through sequence just described except for the fact that the drum will be repositioned on studs #8, #9 and #10 to bring the receptacle for the old tool, i.e., the tool placed in the spindle on the previous tool change cycle, into position to receive such tool when it is returned to the drum at the end of the cycle.

After the last machining operation has been finished with the last tool, a special cycle is utilized to put the tool back into the drum. This is the last time through sequence mentioned earlier herein, the sequence being initiated by the energization of a relay 39CR (137) by a special "2" code on the tape. Accordingly, when the wire 418 (137) is connected through the decoder to the −48 volt source with the master stepping switch MSS on stud #23, relay 39CR will be energized and held energized through its own contacts in lines 138 and 139 and through the contacts of relay 29CR in line 139. Thereby, the normally closed contacts 39CR in lines 20 and 64 will be opened and the normally open contacts 39CR in line 21 and 64 will be closed to select banks TSS-B and TSS-D for use during the last cycle. Also, the contacts 39CR in line 9 will be opened to stop the spindle and the contacts of this relay in line 41 will be closed to energize relay 8CR and cause the spindle carrier to be moved to the tool change position.

It will be noted that studs #1, #3, #5 and #6 of bank TSS-D are connected by wires 419 and 420 directly to the conductor 380. Hence, the stepping switch TSS will immediately be advanced to stud #2. Here, as before, relay 1CR is energized to move the single arm 115 clear of the drum by the operation of plunger 133 thereby permitting the tool putaway on the previous cycle to remain in the drum. The stepping switch is then advanced to stud #4 where a wire 421 is energized to pick up stepping switch 11SS (155) and close the interrupter contacts 11SS-INT (153). This causes stepping switch TSS to be energized from the −48 volt source through the normally closed contacts 90CR (152) and wire 422. Hence, the stepping switch will be advanced to stud #5 thereby dropping stepping switch 11SS which advances to the next stud and selects the store containing the old tool number.

Figure 18D:
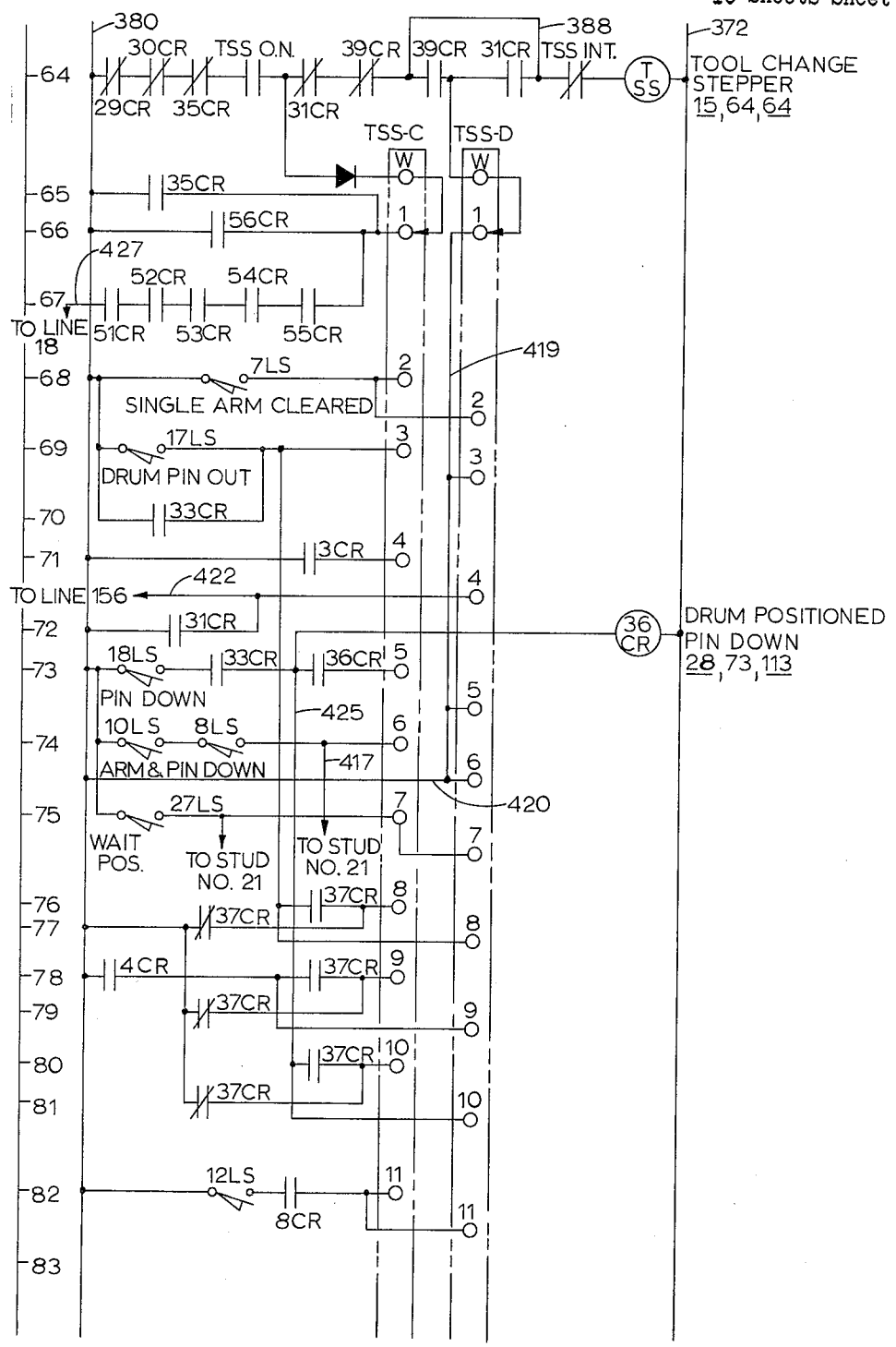
Figure 18E:
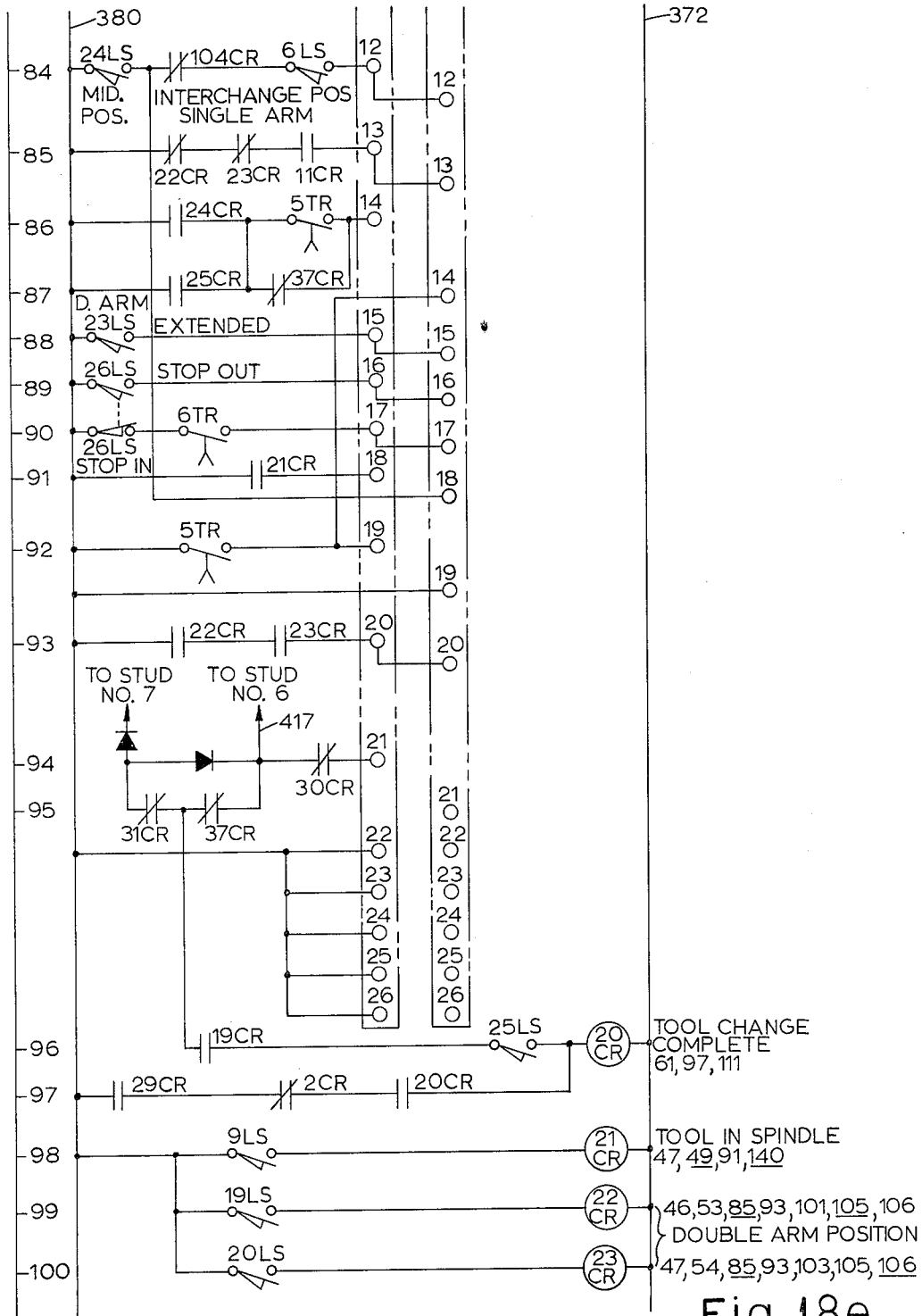
Figure 18F:
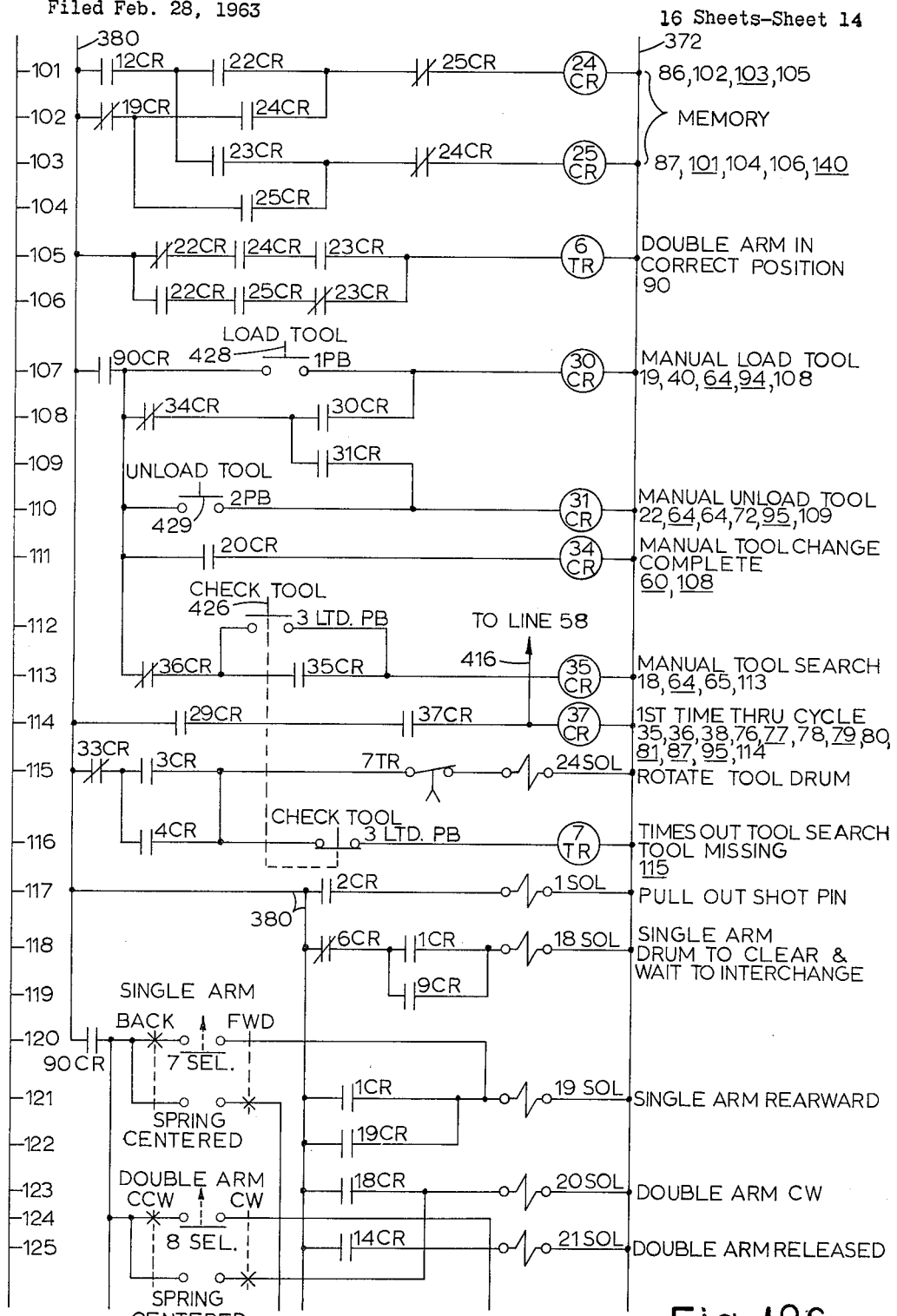
Figure 18G:
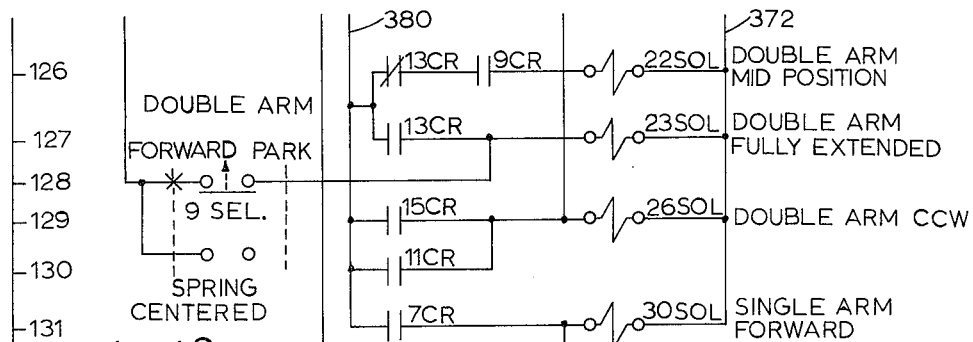

Studs #5 and #6 are skipped and on #7 relay 7CR is energized to move the empty arm 115 to the Wait position. The stepping switch then advances to stud #8 where relay 2CR is energized through wire 423 to cause the shot pin 283 to be pulled out of the cam 280 after which the stepping switch advances to stud #9. Here, relay 4CR is picked up and solenoid 24SOL is energized to rotate the tool drum. Relay 4CR is held energized by its own contacts in line 37, the diode in line 39 and the contacts of relay 39CR in line 41. On stud #10, relay 5CR is energized through wire 424 to drop the shot pin and stop the drum when coincidence is signaled by the closing of contacts 33CR in line 29. At this time, the contacts 33CR in line 115 will open and deenergize solenoid 24SOL to stop the drum. When the pin is seated in the cam, the contacts 18LS in line 73 close and, through a wire 425 connected to stud #10, cause the stepping switch to advance to stud #11. Since the relay 8CR was energized by the closing of contacts 39CR in line 41 at the beginning of the cycle, the spindle carrier should now be in the tool change position. Hence, with the spindle carrier in this position, the limit switch 12LS will be actuated and close its contacts in line 82 thereby advancing the stepping switch TSS to stud #12. Here, relay 9CR is energized to move the single arm to the Interchange position and move the double arm out to its Mid position. The stepping switch then advances through studs #13–#21 to effect operation of the tool change mechanism in the normal manner. The step-by-step operation of the control through these studs is as follows: On stud #13 the double arm is rotated 90° counterclockwise to engage the tool in the spindle. On stud #14 the draw bar motor is operated to release the tool and stud #15 the double arm is fully extended to withdraw the tool from the spindle. On the stud 16 the stop arm 237 is pulled out and on stud #17 the double arm is rotated 180° counterclockwise to move the tool into line with the single arm. On stud #18 the double arm is moved back to Mid position to insert the tool into the single arm. Stud #19 is skipped. On stud #20 the double arm is rotated 90° clockwise to its vertical position. On stud #21 the double arm is returned to the Park position and relay 20CR (96) is thereupon energized. Closure of contacts 20CR in line 61 cause a relay 41CR (63) to be energized thereby signifying the end of the program. The program is terminated by the opening of the normally closed contacts 41CR in line 16 which drops out relay 29CR thereby opening the contacts of this relay in line 139. This drops out relay 39CR and causes the stepping switch TSS to be returned to its home position as shown in FIG. 18d through the normally closed contacts of relays 29CR and 39CR in line 64 which causes automatic stepping of the stepping switch through its off normal make contacts TSS O.N. in line 64. When the wipers reach their home position on stud #1, the off normal make contacts in line 64 will open and prevent further stepping of the switch. Alternatively, automatic stepping of the stepping switch TSS to its home position is effected through the studs #22–#26 of bank TSS-C which regain control when relay 39CR is deenergized. When the Cycle Start pushbutton is depressed to start the next cycle, its contacts in line 63 will be opened thereby deenergizing relay 41CR.

When it is desired to operate the machine manually, the selector switch 6SEL (17) is turned to its Manual position thereby energizing relay 90CR and reversing its contacts in lines 152 and 153. Thereby, the stepping switch 11SS will be homed and relay 28CR will be energized to select Store B. The number of the tool to be selected and placed in the spindle may then be set up on selector switches 1SEL to 5SEL (FIG. 19) which enters the number into Store B.

To check a particular tool in the drum, the tool member is first set up on the selector switches in FIG. 19 after which the push-button 426 (112) is depressed. Thereby, relay 35CR is energized and its contacts line 18 are closed so as to connect the wiper of bank TSS-A to the conductor 380. Since the stopper relays 51CR to 55CR, inclusive, are all energized as a result of the manual selection of the tool number, the contacts of these relays in line 67 will be closed and the wiper of bank TSS-C will be connected through a wire 427 and contacts 35CR (18) to conductor 380 thus causing the stepping switch to move onto the stud #2. Here, the single arm will be moved clear of the drum after which the stepping switch will be moved to stud 3 where the shot pin will be pulled out and the drum will be set into rotation on stud #4. On stud #5, the shot pin will be dropped and rotation of the drum will thereafter be stopped with the selected tool located at the pickup position beneath the single arm 115. When the shot pin is fully seated, relay 36CR (72) will be energized and open its contacts in line 113 to drop out relay 35CR. Thereupon, the contacts 35CR in line 64 will close and cause stepping switch TSS to run self-interrupted through the remainder of the cycle to its home position.

To load a tool into the spindle, the tool number is set into Store B with the aid of the selector switches 1SEL to 5SEL as previously described. The push-button 428 (107) is then depressed to energize relay 30CR which closes its contacts in line 19 and connects the wiper of bank TSS-A to the conductor 380. Since the stopper relays 51CR to 55CR, inclusive, are all energized, the contacts of these relays in line 67 will be closed and the wiper of bank TSS-C will be connected through these contacts and wire 427 to conductor 380 (19) and cause the stepping switch to advance to stud #2. From this point on, the cycle will proceed on the same manner as in the first time through sequence previously described in which relay 37CR is deenergized so that the steps performed on studs #8, #9 and #10 for repositioning the drum to receive the old tool are dispensed with. Stud #14 is also skipped since there is no need to release the draw bar. Relay 30CR also has a pair of contacts in line 40 which by passes the contacts 415 and permits the cycle to proceed without the signal from the machine. The feedback signal normally provided on stud #21 of bank TSS–C is interrupted until relay 20CR is energized thereby picking up relay 34CR (111) which drops relay 30CR and closes the contacts of this relay in line 94. The stepping switch will thereby be stepped onto stud #22 and will run self-interrupted to the home position.

To unload the spindle, the number of the tool in the spindle is set up on the selector switches 1SEL to 5SEL, inclusive, and the push-button 429 (110) is depressed. Thereby, relay 31CR is energized and is held energized through its own contacts in line 109 and the normally closed contacts of relay 34CR in line 108. When relay 31CR is energized, its normally open contacts in lines 22 and 64 select banks TSS–B and TSS–D of the stepping switch and the cycle proceeds in essentially the same manner as the last time through sequence described earlier. That is, the single arm is moved forward to the Wait position after which the drum is positioned in accordance with the number contained in Store B. The spindle carrier is moved to the tool change position, the single arm is moved to the Interchange position, and the double arm to the Mid position. The spindle is then stopped and the double arm rotated to engage the tool. The draw bar motor is then operated to release the tool after which it is withdrawn from the spindle and transferred to the single arm which, on stud #21, returns it to the Drum position.

It will be noted that relay 90CR also has a pair of contacts in line 120 which condition selector switches 7SEL (120), 8SEL (124), and 9SEL (128) to control manual operation of the arms 115 and 145. Thus, switch 7SEL may be manipulated to move the single arm back to the Drum position or forward to the Interchange position. By means of switch 8SEL, the double arm may be rotated 180° counterclockwise or 90° clockwise. Switch 9SEL enables the operator to move the double arm to its fully extended position or to its Park position.

While the invention has been described in connection with one possible form or embodiment thereof and certain specific terms and language have therefore been used herein, it is to be understood that the present disclosure is illustrative rather than restrictive and that changes and modifications may be resorted to without departing from the boundaries of the invention as defined by the claims which follow.

What is claimed is:

1. Apparatus for automatically loading a tool into the spindle of a machine tool comprising a frame, an indexable storage means on said frame for receiving and holding a plurality of cutting tools ready for loading into the spindle, means for indexing said storage means to move a selected tool therein into a pickup position, a single arm on said frame for engaging the tool in the pickup position and moving it to an interchange position, and a double arm having portions thereon movable between said spindle and the interchange position for removing the tool from said single arm and transferring it to the spindle.

2. Apparatus for automatically loading a tool into and unloading a tool from the spindle of a machine tool comprising a frame, an indexable storage means on said frame having receptacles for receiving and holding a plurality of cutting tools ready for loading into the spindle, means for indexing said storage means to move a selected receptacle into a pickup position, a single arm on said frame movable between said pickup position and an interchange position for transferring a tool therebetween, and a double arm having portions thereon movable between said spindle and said interchange position for transferring a tool either from the interchange position to the spindle in a loading operation, or from the spindle to the interchange position in an unloading operation.

3. Apparatus for automatically changing the tool in the spindle of a machine tool at the conclusion of a machining operation comprising a frame, an indexable storage means on said frame having receptacles for receiving and holding a plurality of cutting tools ready for use in the spindle of the machine tool, means for indexing said storage means to move a selected receptacle into a pickup position, a single arm on said frame movable between said pickup position and an interchange position for transferring a tool from the storage means to the interchange position and vice versa, and a double arm having portions thereon movable between said spindle and said interchange position for exchanging the tool in the spindle with the tool held in the single arm at the interchange position whereby the tool in the storage means may be loaded into the spindle and the tool in the spindle may be returned to the storage means.

4. A device for automatically changing the tool in the spindle of a machine tool at the end of a machining operation comprising a frame, a storage means on said frame, a plurality of receptacles in said storage means for receiving and holding a plurality of cutting tools ready for use during a machining program, each receptacle being associated with a particular tool, a first store for containing data identifying the receptacle for the new tool and a second store for containing data identifying the receptacle for the old tool, selection means cooperating with said stores for moving one or the other of said receptacles to a pickup position, a single arm on said frame movable between said pickup position and an interchange position for transferring the new tool from its storage receptacle to the interchange position and the old tool from the interchange position to its storage receptacle, a double arm having portions thereon movable between said spindle and said interchange position for interchanging the old tool in the spindle with the new tool held in the single arm at the interchange position, and cycle control means for causing said selection means to move the receptacle containing the new tool into the pickup position for transferral by said single arm from the pickup position to the interchange position, and to move the receptacle for the old tool into the pickup position before the single arm returns to the pickup position with the told tool from the spindle.

5. A device for automatically changing the tool in the spindle of a machine tool at the end of a machining operation comprising a frame, a storage means on said frame, a plurality of receptacles in said storage means for receiving and holding a plurality of tools ready for use during a machining program, there being one receptacle for the new tool being loaded into the spindle and another receptacle for the old tool being unloaded therefrom, selection means for moving one or the other of said receptacles to a pickup position, a double arm having portions thereon movable between said spindle and an interchange position for interchanging the old tool in the spindle with the new tool at the interchange position, a single arm on said frame having a portion thereon movable between said pickup position and said interchange position for transferring the new tool from its receptacle to the interchange position and the old tool from the interchange position to its receptacle, and means for causing said selection means to move the receptacle for the old tool to the pickup position after said single arm has removed the new tool from its receptacle.

6. The tool changing device of claim 5 including a first store for containing data identifying the receptacle for the new tool and a second store for containing data identifying the receptacle for the old tool, said selection means operating under the control of said stores for moving one or the other of said receptacles to the pickup position.

7. The tool changing device of claim 6 wherein said selection means includes a data coded device associated with each of said receptacles, and means for reading the data from each of said devices as its receptacle passes the pickup position.

8. The tool changing device of claim 7 wherein each of said stores includes a plurality of coincidence banks, and a circuit connected with said banks and with said reading means for signifying when the data contained in one of said stores is identical with that read from the data coded devices.

9. An automatic tool change mechanism for a machine tool having a power driven spindle adapted to receive and hold a cutting tool therein comprising a frame, an indexable storage means on said frame having a plurality of receptacles for receiving and holding a plurality of cutting tools ready for use in the spindle during a machining program, means for locking each tool in its associated receptacle, means for indexing said storage means to position a selected tool therein at a pickup position, a single arm on said frame for transferring the tool from the pickup position to an interchange position, selectively operable means on said arm for engaging said tool and disabling said locking means to release the tool from its receptacle, and a double arm having portions thereon movable between said spindle and the interchange position for transferring the tool from the single arm to the spindle.

10. The automatic tool change mechanism of claim 9 wherein said receptacles each are comprised of a semicircular recess for receiving a corresponding cylindrical portion on its associated tool, and each of said locking means includes a pivoted element having an arcuate surface thereon which serves to extend the semi-circular recess beyond 180°.

11. The automatic tool change mechanism of claim 10 wherein said locking means includes a latch for holding said element against pivotal movement in a direction to release the tool from the recess.

12. The automatic tool change mechanism of claim 11 including means on said latch adapted for engagement by said selectively operable means for disabling said latch and releasing said element.

13. An automatic tool change mechanism for a machine tool having a power driven spindle and means for receiving and holding a cutting tool therein comprising a frame, a sleeve rotatably supported in said frame, a hollow shaft mounted for axial sliding movement within said sleeve, an arm on said shaft for transferring a cutting tool to and from the spindle, selectively operable jaws on said arm movable to and from a tool engaging position, a plunger mounted for axial sliding movement within said shaft for controlling the operation of said jaws, a recess in said sleeve, and a member moving with said shaft and cooperating with said recess for controlling the movement of said plunger.

14. The automatic tool change mechanism of claim 13 including means for resiliently urging said jaws into their tool engaging positions under the control of said member, and means for moving said shaft relative to said sleeve to permit said member to enter said recess and cause said jaws to move to their tool engaging position.

15. A mechanism for automatically changing the tool in the spindle of a machine tool comprising a frame, a storage drum rotatably supported on said frame, means on said drum for holding a plurality of tools ready for transfer to the spindle of the machine tool, a double arm supported for rotation about an axis parallel to the axis of said spindle, means on said arm for moving a tool from said spindle to an interchange position and vice versa, a single arm supported on said frame for rotation about an axis perpendicular both to the axis of said drum and also to the axis of said double arm, means on said single arm for moving a tool from said drum to said interchange position and vice versa, and automatic cycle control means for moving said arms in proper timed relationship to transfer a tool from the drum to the spindle and back again.

16. A mechanism for automatically changing the tool in the spindle of a machine tool comprising a frame, a storage drum rotatably supported on said frame, means spaced about the periphery of said drum for holding a plurality of cutting tools thereon with their longitudinal axes disposed parallel to the axis of said drum, said cutting tools each having an elongated shank thereon, a double arm supported for rotation about an axis parallel to the axis of said spindle, means on said arm for moving a tool from said spindle to an interchange position and vice versa, a single arm supported on said frame for rotation about an axis perpendicular both to the axis of said drum and also to the axis of said double arm, means on said single arm for engaging the shank of a selected tool on said drum and for moving said tool with its longitudinal axis disposed generally parallel with the longitudinal axis of the arm from the drum to said interchange position and vice versa, and automatic cycle control means for moving said arms in proper timed relationship to transfer a tool from the drum to the spindle and back again.

17. The automatic tool changing mechanism of claim 16 wherein said engaging means includes an open-sided socket on said single arm for receiving the shank of a selected tool and holding the tool with its axis extending in the general direction of the length of said arm, and a rod supported by said arm for axial sliding movement in a direction substantially to the axis of said tool for holding the shank thereof against dislodgement from said socket.

18. The automatic tool changing mechanism of claim 17 including means for resiliently urging said rod into its tool engaging position, and means for retracting said rod against the urgency of said resilient means, including a plunger disposed transversely with respect to said rod and having an operating portion thereon extending from the side of said arm.

19. The automatic tool changing mechanism of claim 18 wherein said last-named means includes a hydraulic piston for cooperation with the operating portion of said plunger, said piston being movable from a projected position in which said rod is retracted and said single arm is held clear of said drum, to a retracted position in which the socket on said arm is engageable with a tool held in the tool drum and the rod is released to hold the shank of the tool in said socket.

20. The automatic tool changing means of claim 16 wherein said means on said double arm includes a semicircular socket on the end of said arm for engaging the tool ahead of the portion engaged by the single arm, and a movable jaw for contacting the tool and holding it in the socket.

21. An automatic tool change mechanism for a machine tool having a power operated spindle adapted to receive and hold a cutting tool therein comprising a frame, a storage means on said frame having a plurality of receptacles for receiving and holding a plurality of cutting tools ready for use in the spindle of the machine tool during a machining program, means for successively moving said receptacles through a pickup position, means, including a coded cartridge on said drum and a reading head on said frame for selecting a particular one of said receptacles and stopping it at the pickup position, a single arm mounted on said frame for engaging the tool in the receptacle located at the pickup position and moving it to an interchange position, and a double arm having portions thereon movable between the spindle and the interchange position for removing the tool from the single arm and placing it in the spindle.

References Cited by the Examiner
UNITED STATES PATENTS

| 2,901,927 | 9/1959 | Morgan | 29—26 |
| 3,052,011 | 9/1962 | Brainard | 29—26 |
| 3,099,873 | 8/1963 | Brainard | 29—26 |

RICHARD H. EANES, JR., *Primary Examiner.*